United States Patent
Kitano et al.

(10) Patent No.: US 7,141,646 B2
(45) Date of Patent: *Nov. 28, 2006

(54) METHOD OF PURIFYING VINYL POLYMER

(75) Inventors: Kenichi Kitano, Osaka (JP); Yoshiki Nakagawa, Osaka (JP)

(73) Assignee: Kaneka Corporation, Osaka (JP)

( * ) Notice: Subject to any disclaimer, the term of this patent is extended or adjusted under 35 U.S.C. 154(b) by 228 days.

This patent is subject to a terminal disclaimer.

(21) Appl. No.: 10/275,911

(22) PCT Filed: May 14, 2001

(86) PCT No.: PCT/JP01/03986

§ 371 (c)(1),
(2), (4) Date: May 28, 2003

(87) PCT Pub. No.: WO01/85804

PCT Pub. Date: Nov. 15, 2001

(65) Prior Publication Data

US 2003/0181634 A1    Sep. 25, 2003

(30) Foreign Application Priority Data

May 12, 2000 (JP) ............................. 2000-139284
May 12, 2000 (JP) ............................. 2000-139285
May 12, 2000 (JP) ............................. 2000-139286

(51) Int. Cl.
*C08F 6/00* (2006.01)
(52) U.S. Cl. .................. 528/482; 525/330.4; 525/386; 525/388; 528/480; 528/483
(58) Field of Classification Search ............ 525/330.4, 525/386, 388; 528/480, 482, 483
See application file for complete search history.

(56) References Cited

U.S. PATENT DOCUMENTS 6,794,461 B1 * 9/2004 Fujita et al. ............. 525/330.4

FOREIGN PATENT DOCUMENTS

| CN | 1210111 | | 3/1999 |
|---|---|---|---|
| EP | 1 197 496 A1 | | 4/2002 |
| EP | 1 277 804 A1 | | 1/2003 |
| JP | 6-157638 A | | 6/1994 |
| JP | 7-74073 A | | 3/1995 |
| JP | 8-208742 A | | 8/1996 |
| JP | 11193307 | | 7/1999 |
| JP | 200396130 | * | 4/2003 |
| WO | WO-96/30421 A1 | | 10/1996 |
| WO | WO-00/56795 | | 9/2000 |

OTHER PUBLICATIONS

Bela Ivan et al., "New Telechelic Polymers and Sequential Copolymers by Polyfunctional Initiator-Transfer Agents (Inifers). VII. Synthesis and Characterization of α, ω D1 (Hydroxy) Polyisobutylene", Journal of Polymer Science: Polymer Chemistry Edition, vol. 18, 1980, pp. 3177-3191.

* cited by examiner

*Primary Examiner*—Terressa Boykin
(74) *Attorney, Agent, or Firm*—Connolly, Bove, Lodge & Hutz, LLP

(57) ABSTRACT

The present invention provides a method of purifying a vinyl polymer to be used as a component of a composition capable of undergoing hydrosilylation.

The present invention provides a vinyl polymers obtainable by atom transfer radical polymerization can be purified economically and efficiently by adsorption treatment using an acidic adsorbent and a basic adsorbent combinedly, with the result that the reactivity in hydrosilylation thereof is improved. Thus, the polymers can be used as components in hydrosilylation reaction-susceptible compositions.

26 Claims, No Drawings

METHOD OF PURIFYING VINYL POLYMER

TECHNICAL FIELD

The present invention relates to a method of purifying vinyl polymers, vinyl polymers, a hydrosilylation reaction-susceptible composition, and a curable composition.

BACKGROUND ART

The hydrosilylation reaction is utilized in functional group conversion, crosslinking and other reactions and is one of very useful reactions from the industrial viewpoint. It is known, for example, that a polymer having an alkenyl group as a functional group at a molecular chain terminus can be crosslinked and cured to give cured products excellent in heat stability, durability and the like properties when a hydrosilyl group-containing compound is used as a curing agent, and that when an alkenyl group-terminated polymer is reacted with a a hydrosilyl group-containing compound having a crosslinkable silyl group, a crosslinkable silyl group-terminated polymer is produced. These hydrosilylation reactions proceed upon heating, and a hydrosilylation catalyst is added for causing the reactions to proceed more rapidly. Such hydrosilylation catalyst includes radical initiators, such as organic peroxides and azo compounds, and transition metal catalysts. In particular, it is known that when a transition metal catalyst is used in a catalytic amount, the hydrosilylation can be allowed to proceed rapidly.

On the other hand, living polymerization is generally known as a precise method of polymer synthesis. A feature of living polymerization is that not only the molecular weight and molecular weight distribution can be controlled but also polymers definite in terminal structure can be obtained. Therefore, living polymerization may be mentioned as one of effective methods of functional group introduction at a polymer terminus or termini. In radical polymerization as well, polymerization systems in which living polymerization is possible have recently been found and, thus, advanced studies on living radical polymerization are underway. In particular, when atom transfer radical polymerization is utilized, polymers narrow in molecular weight distribution can be obtained. As examples of atom transfer radical polymerization systems, there may be mentioned polymerization systems using, as an initiator, an organic halide or halogenated sulfonyl compound and, as a catalyst, a metal complex with a central atom selected from among elements of the group 8, 9, 10, and 11 of the periodic table of the elements. (For example, see Matyjaszewski et al., J. Am. Chem. Soc., 1995, 117, 5614, Macromolecules, 1995, 28, 7901, Science, 1996, 272, 866, or Sawamoto et al., Macromolecules, 1995, 28, 1721).

However, the transition metal complex, namely the polymerization catalyst, remains in the vinyl polymers produced by atom transfer radical polymerization, producing such problems as coloration of the polymers, influences on the physical properties thereof, and environmental safety problems. For example, in the case of alkenyl group-terminated vinyl polymers produced by utilizing the atom transfer radical polymerization technique, the residual catalyst and the like serve as catalyst poisons in the hydrosilylation reaction and, thus, the hydrosilylation reaction is inhibited, producing a problem in that the expensive transition metal catalyst is required in larger amounts.

The present inventors previously found that the hydrosilylation activity of vinyl polymers obtainable by atom transfer radical polymerization can be improved by purifying the polymers by bringing them into contact with an adsorbent such as aluminum silicate (Japanese Kokai Publication Hei-11-193307). On that occasion, however, the adsorbent is required in large amounts, causing such problems as an environmental impact by the waste and an adsorbent-related increase in purification cost. It is an object of the present invention to solve these problems and provide an economical and efficient method of purifying vinyl polymers as well as a polymer and a composition capable of reacting in the manner of hydrosilylation.

SUMMARY OF THE INVENTION (1) The present invention relates to a method of purifying a vinyl polymer obtainable by atom transfer radical polymerization of a vinyl monomer(s) using a transition metal complex as a polymerization catalyst which method comprises bringing the vinyl polymer into contact with an acidic adsorbent and a basic adsorbent in a total amount of 0.01 to 10 parts by weight per 100 parts by weight of the vinyl polymer.

(2) The present invention also relates to a method of purifying a vinyl polymer as mentioned above, wherein the acidic adsorbent and/or basic adsorbent is an inorganic adsorbent;

a method of purifying a vinyl polymer as mentioned above, wherein the acidic adsorbent is activated terra alba or aluminum silicate;

a method of purifying a vinyl polymer as mentioned above, wherein the acidic adsorbent is aluminum silicate;

a method of purifying a vinyl polymer as mentioned above, wherein the basic adsorbent is activated alumina, or a hydrotalcite; and a method of purifying a vinyl polymer as mentioned above, wherein the basic adsorbent is a hydrotalcite.

(3) The present invention further relates to a method of purifying a vinyl polymer as mentioned above, wherein a solution of the vinyl polymer with a vinyl polymer concentration of not less than 90% by weight is brought into contact with an acidic adsorbent and/or a basic adsorbent; and a method of purifying a vinyl polymer as mentioned above, wherein the vinyl polymer is brought into contact with an acidic adsorbent and/or a basic adsorbent without using any solvent.

(4) The present invention further relates to a method of purifying a vinyl polymer as mentioned above, wherein the vinyl polymer has a halogen group;

a method of purifying a vinyl polymer as mentioned above, wherein the vinyl polymer has an alkenyl group;

a method of purifying a vinyl polymer as mentioned above, wherein the vinyl polymer is one obtainable by producing a halogen group-containing vinyl polymer by atom transfer radical polymerization and converting the halogen group to a substituent other than the halogen group by a nucleophilic substitution reaction; and a method of purifying a vinyl polymer as mentioned above, wherein the vinyl polymer is brought into contact with an acidic adsorbent and/or a basic adsorbent without removing, from the polymer, the unreacted nucleophilic reagent and/or the halide resulting from the nucleophilic substitution reaction.

(5) The present invention further relates to a method of purifying a vinyl polymer as mentioned above, wherein the central atom of the transition metal complex is copper;

a method of purifying a vinyl polymer as mentioned above, wherein a triamine compound is used as a ligand to the catalyst in the atom transfer radical polymerization; and a method of purification as mentioned above, wherein the acidic adsorbent and basic adsorbent are used in a total amount of 0.1 to 10 parts by weight per 100 parts by weight of the vinyl polymer.

(6) The present invention further relates to a vinyl polymer which is obtainable by the method of purifying a vinyl polymer as mentioned above;

a hydrosilylation-susceptible composition which comprises (A) the vinyl polymer obtainable by any of the above methods of purifying a vinyl polymer;

a hydrosilylation-susceptible composition which comprises (A) the vinyl polymer obtainable by any of the above methods of purifying a vinyl polymer and (B) a hydrosilyl group-containing compound; and a hydrosilylation-susceptible composition which comprises (A) the vinyl polymer obtainable by any of the above methods of purifying a vinyl polymer, (B) a hydrosilyl group-containing compound and (C) a platinum catalyst.

(7) The present invention further relates to a vinyl polymer which is obtainable by subjecting the above hydrosilylation-susceptible composition to hydrosilylation;

a crosslinkable silyl group-containing vinyl polymer which is obtainable by subjecting the above hydrosilylation-susceptible composition to hydrosilylation;

a cured product which is obtainable by subjecting the above hydrosilylation-susceptible composition to hydrosilylation;

a molded article which is obtainable by subjecting the above hydrosilylation-susceptible composition to hydrosilylation; and a method of producing vinyl polymers which comprises using any of the above methods of purifying a vinyl polymer.

DETAILED DESCRIPTION OF THE INVENTION

The present invention relates to a method of purifying a vinyl polymer obtainable by atom transfer radical polymerization of a vinyl monomer(s) using a transition metal complex as a polymerization catalyst which method comprises bringing the vinyl polymer into contact with an acidic adsorbent and a basic adsorbent in a total amount of 0.01 to 10 parts by weight per 100 parts by weight of the vinyl polymer. The vinyl polymer to be purified is one produced by utilizing the technique of atom transfer radical polymerization.

Atom Transfer Radical Polymerization

First, the atom transfer radical polymerization technique is described in detail. The technique of atom transfer radical polymerization, so referred to herein, is one of living radical polymerization techniques and comprises polymerizing a vinyl monomer(s) using an organic halide or halogenated sulfonyl compound as an initiator and, as a catalyst, a metal complex having a transition metal as a central atom. As specific references, there may be mentioned Matyjaszewski et al.: J. Am. Chem. Soc., 1995, vol. 117, page 5614, Macromolecules, 1995, vol. 28, page 7901, Science, 1996, vol. 272, page 866, WO 96/30421, WO 97/18247, WO 98/01480, WO 98/40415, and Sawamoto et al.: Macromolecules, 1995, vol. 28, page 1721, Japanese Kokai Publication Hei-09-208616 and Japanese Kokai Publication Hei-08-41117, among others.

In this atom transfer radical polymerization, an organic halide, in particular a highly reactive carbon-halogen bond-containing organic halide (e.g. a carbonyl compound having a halogen at an $\alpha$-position or a compound having a halogen at a benzyl position), a halogenated sulfonyl compound or the like is used as an initiator. Specific examples are as follows:

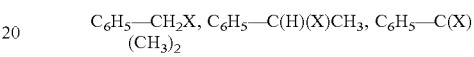
$C_6H_5$—$CH_2X$, $C_6H_5$—$C(H)(X)CH_3$, $C_6H_5$—$C(X)(CH_3)_2$ (in the above chemical formulas, $C_6H_5$ is a phenyl group and X is a chlorine, bromine or iodine atom);

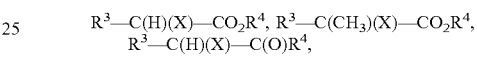
$R^3$—$C(H)(X)$—$CO_2R^4$, $R^3$—$C(CH_3)(X)$—$CO_2R^4$,
$R^3$—$C(H)(X)$—$C(O)R^4$,

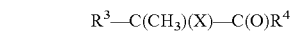
$R^3$—$C(CH_3)(X)$—$C(O)R^4$ (in the above formulas, $R_3$ and $R^4$ each is a hydrogen atom or an alkyl, aryl or aralkyl group containing 1 to 20 carbon atoms and X is a chlorine, bromine or iodine atom);

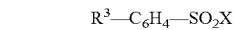
$R^3$—$C_6H_4$—$SO_2X$ (in the above formula, $R^3$ is a hydrogen atom or an alkyl, aryl or aralkyl group containing 1 to 20 carbon atoms and X is a chlorine, bromine or iodine atom); and the like.

When atom transfer radical polymerization of a vinyl monomer(s) is carried out using an organic halide or halogenated sulfonyl compound as an initiator, a vinyl polymer having a terminal structure represented by the general formula (1):

$$-C(R^1)(R^2)(X) \qquad (1)$$

wherein $R^1$ and $R^2$ each represents a group bound to an ethylenically unsaturated group of a vinyl monomer and X represents a chlorine, bromine or iodine atom is obtained.

An organic halide or halogenated sulfonyl compound having a further specific reactive functional group not associated with initiating the polymerization in addition to the functional group for initiating the polymerization may also be used as the initiator in atom transfer radical polymerization. In such case, vinyl polymers having the further specific reactive functional group at one main chain terminus and a terminal structure represented by the general formula (1) at the other main chain terminus are produced. As such specific reactive functional group, there may be mentioned alkenyl, crosslinkable silyl, hydroxyl, epoxy, amino and amide groups, among others. By utilizing the reactivity of such reactive functional group, it becomes possible to introduce an appropriate other functional group into the vinyl polymer through one or a plurality of reaction steps.

The alkenyl group-containing organic halide is not particularly restricted but includes, among others, those having a structure represented by the general formula (2):

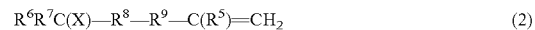
$$R^6R^7C(X)-R^8-R^9-C(R^5)=CH_2 \qquad (2)$$

wherein $R^5$ is a hydrogen atom or a methyl group, $R^6$ and $R^7$ each is a hydrogen atom or a univalent alkyl, aryl or aralkyl group containing 1 to 20 carbon atoms and such $R^6$ and $R^7$ groups may be bound together at the respective other ends, $R^8$ is —C(O)O— (ester group), —C(O)— (keto group) or an o-, m- or p-phenylene group, $R^9$ is a direct bond or a bivalent organic group containing 1 to 20 carbon atoms, which may contain one or more ether bonds, and X is a chlorine, bromine or iodine atom.

As specific examples of the substituent $R^6$ and $R^7$, there may be mentioned a hydrogen atom, and methyl, ethyl, n-propyl, isopropyl, butyl, pentyl, hexyl and like groups. $R^6$ and $R^7$ may be connected to each other at the respective other ends to form a cyclic skeleton.

As specific examples of the alkenyl-containing organic halide represented by the general formula (2), there may be mentioned the following:

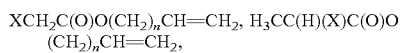

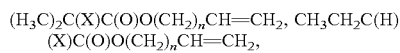

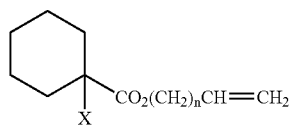

(in the above formulas, X is a chlorine, bromine or iodine atom and n is an integer of 0 to 20);

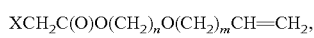

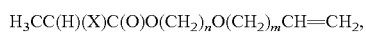

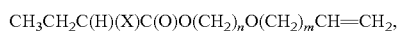

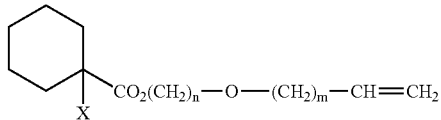

(in the above formulas, X is a chlorine, bromine or iodine atom, n is an integer of 1 to 20 and m is an integer of 0 to 20);

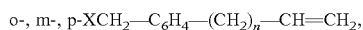

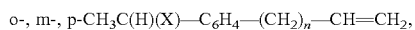

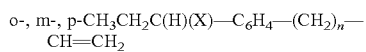

(in the above formulas, X is a chlorine, bromine or iodine atom and n is an integer of 0 to 20);

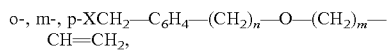

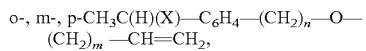

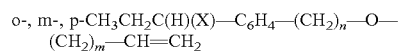

(in the above formulas, X is a chlorine, bromine or iodine atom, n is an integer of 1 to 20 and m is an integer of 0 to 20);

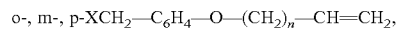

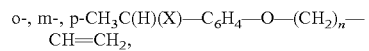

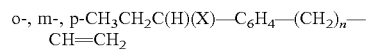

(in the above formulas, X is a chlorine, bromine or iodine atom and n is an integer of 0 to 20); and

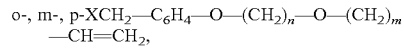

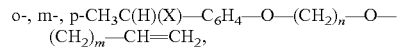

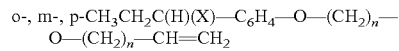

(in the above formulas, X is a chlorine, bromine or iodine atom, n is an integer of 1 to 20 and m is an integer of 0 to 20).

As the alkenyl group-containing organic halide, there may further be mentioned compounds represented by the general formula (3):

$$H_2C=C(R^5)-R^9-C(R^6)(X)-R^{10}-R^7 \quad (3)$$

wherein $R^5$, $R^6$, $R^7$, $R^9$ and X are as defined above and $R^{10}$ represents a direct bond, —C(O)O— (ester group), —C(O)— (keto group) or an o-, m- or p-phenylene group.

$R^9$ is a direct bond or a bivalent organic group (which may contain one or more ether bonds) containing 1 to 20 carbon atoms. When it is a direct bond, a vinyl group is bound to the carbon atom to which a halogen is bound, whereby an allyl halide compound is formed. In this case, the carbon-halogen bond is activated by the neighboring vinyl group, so that $R^{10}$ is not always required to be a C(O)O or phenylene group, for instance, but may be a direct bond. When $R^9$ is other than a direct bond, $R^{10}$ should preferably be a C(O)O, C(O) or phenylene group so that the carbon-halogen bond may be activated.

Specific examples of the compound of general formula (3) are as follows:

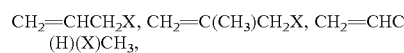

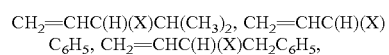

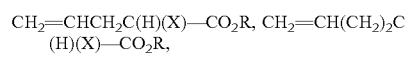

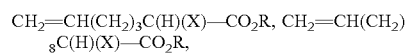

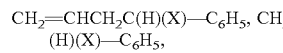

(in the above formulas, X is a chlorine, bromine or iodine atom and R is an alkyl, aryl or aralkyl group containing 1 to 20 carbon atoms), etc.

The following may be mentioned as specific examples of the alkenyl group-containing halogenated sulfonyl compound:

o-, m-, p-CH$_2$=CH—(CH$_2$)$_n$—C$_6$H$_4$—SO$_2$X, o-, m-, p-CH$_2$=CH—(CH$_2$)$_n$—O—C$_6$H$_4$—SO$_2$X (in the above formulas, X is a chlorine, bromine or iodine atom and n is an integer of 0 to 20); etc.

The above-mentioned crosslinkable silyl group-containing organic halide is not particularly restricted but includes, among others, compounds having a structure represented by the general formula (4):

$$R^6R^7C(X)—R^8—R^9—C(H)(R^5)CH_2—[Si(R^{11})_{2-b}(Y)_b O]_m—Si(R^{12})_{3-a}(Y)_a \quad (4)$$

wherein $R^5$, $R^6$, $R^7$, $R^8$, $R^9$ and X are as defined above, $R^{11}$ and $R^{12}$ each represents an alkyl, aryl or aralkyl group containing 1 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more $R^{11}$ or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19 provided that the relation a+mb≧1 is satisfied.

Thehydrolyzable group includes, among others, a hydrogen atom, and those groups in general use, such as alkoxy, acyloxy, ketoximate, amino, amide, aminoxy, mercapto and alkenyloxy groups. Among these, alkoxy, amide and aminoxy groups are preferred. Alkoxy groups are particularly preferred because of their mild hydrolyzability and easy handleability.

Specific examples of the compound of general formula (4) are as follows:

XCH$_2$C(O)O(CH$_2$)$_n$Si(OCH$_3$)$_3$, CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$)(OCH$_3$)$_2$,

CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$ (in the above formulas, X is a chlorine, bromine or iodine atom and n is an integer of 0 to 20);

XCH$_2$C(O)O(CH$_2$)$_n$O(CH$_2$)$_m$Si(OCH$_3$)$_3$,

H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$,

CH$_3$CH$_2$C(H)(X)C(O)O(CH$_2$)$_n$O(CH$_2$)$_m$Si(OCH$_3$)$_3$,

XCH$_2$C(O)O(CH$_2$)$_n$O(CH$_2$)$_m$Si(CH$_3$)(OCH$_3$)$_2$,

H$_3$CC(H)(X)C(O)O(CH$_2$)$_n$O(CH$_2$)$_m$Si(CH$_3$)(OCH$_3$)$_2$, (H$_3$C)$_2$C(X)C(O)O(CH$_2$)$_n$O(CH$_2$)$_m$Si(CH$_3$)(OCH$_3$)$_2$,

CH$_3$CH$_2$C(H)(X)C(O)O(CH$_2$)$_n$O(CH$_2$)$_m$Si(CH$_3$)(OCH$_3$)$_2$ (in the above formulas, X is a chlorine, bromine or iodine atom, n is an integer of 1 to 20 and m is an integer of 0 to 20);

o-, m-, p-XCH$_2$—C$_6$H$_4$—(CH$_2$)$_2$Si(OCH$_3$)$_3$, o-, m-, p-CH$_3$C(H)(X)—C$_6$H$_4$—(CH$_2$)$_2$Si(OCH$_3$)$_3$, o-, m-, p-CH$_3$CH$_2$C(H)(X)—C$_6$H$_4$—(CH$_2$)$_2$Si(OCH$_3$)$_3$, o-, m-, p-XCH$_2$—C$_6$H$_4$—(CH$_2$)$_3$Si(OCH$_3$)$_3$, o-, m-, p-CH$_3$C(H)(X)—C$_6$H$_4$—(CH$_2$)$_3$Si(OCH$_3$)$_3$, o-, m-, p-CH$_3$CH$_2$C(H)(X)—C$_6$H$_4$—(CH$_2$)$_3$Si(OCH$_3$)$_3$, o-, m-, p-XCH$_2$—C$_6$H$_4$—(CH$_2$)$_2$—O—(CH$_2$)$_3$Si(OCH$_3$)$_3$, o-, m-, p-CH$_3$C(H)(X)—C$_6$H$_4$—(CH$_2$)$_2$—O—(CH$_2$)$_3$Si(OCH$_3$)$_3$, o-, m-, p-CH$_3$CH$_2$C(H)(X)—C$_6$H$_4$—(CH$_2$)$_2$—O—(CH$_2$)$_3$Si(OCH$_3$)$_3$, o-, m-, p-XCH$_2$—C$_6$H$_4$—O—(CH$_2$)$_3$Si(OCH$_3$)$_3$, o-, m-, p-CH$_3$C(H)(X)—C$_6$H$_4$—O—(CH$_2$)$_3$Si(OCH$_3$)$_3$, o-, m-, p-CH$_3$CH$_2$C(H)(X)—C$_6$H$_4$—O—(CH$_2$)$_3$—Si(OCH$_3$)$_3$, o-, m-, p-XCH$_2$—C$_6$H$_4$—O—(CH$_2$)$_2$—O—(CH$_2$)$_3$—Si(OCH$_3$)$_3$, o-, m-, p-CH$_3$C(H)(X)—C$_6$H$_4$—O—(CH$_2$)$_2$—O—(CH$_2$)$_3$Si(OCH$_3$)$_3$, o-, m-, p-CH$_3$CH$_2$C(H)(X)—C$_6$H$_4$—O—(CH$_2$)$_2$—O—(CH$_2$)$_3$Si(OCH$_3$)$_3$ (in the above formulas, X is a chlorine, bromine or iodine atom); etc.

As further examples of the above-mentioned crosslinkable silyl group-containing organic halide, there may be mentioned compounds having a structure represented by the general formula (5):

$$(R^{12})_{3-a}(Y)_a Si—[OSi(R^{11})_{2-b}(Y)_b]_m—CH_2—C(H)(R^5)—R^9—C(R^6)(X)—R^{10}—R^7 \quad (5)$$

wherein $R^5$, $R^6$, $R^7$, $R^9$, $R^{10}$, $R^{11}$, $R^{12}$, a, b, m, X and Y are as defined above.

Specific examples of such compound are as follows:

(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$,

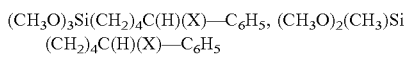

(in the above formulas, X is a chlorine, bromine or iodine atom and R is an alkyl, aryl or aralkyl group containing 1 to 20 carbon atoms); etc.

The above-mentioned hydroxyl-group containing organic halide or halogenated sulfonyl compound is not particularly restricted but includes, for example, the following:

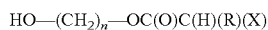

wherein X is a chlorine, bromine or iodine atom, R is a hydrogen atom or an alkyl, aryl or aralkyl group containing 1 to 20 carbon atoms and n is an integer of 1 to 20.

The above-mentioned amino-group containing organic halide or halogenated sulfonyl compound is not particularly restricted but includes, for example, the following:

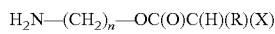

wherein X is a chlorine, bromine or iodine atom, R is an alkyl, aryl or aralkyl group containing 1 to 20 carbon atoms and n is an integer of 1 to 20.

The above-mentioned epoxy group-containing organic halide or halogenated sulfonyl compound is not particularly restricted but includes, among others, the following:

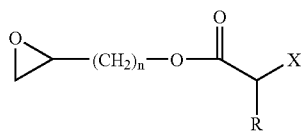

wherein X is a chlorine, bromine or iodine atom, R is a hydrogen atom or an alkyl, aryl or aralkyl group containing 1 to 20 carbon atoms and n is an integer of 1 to 20.

For obtaining polymers having two or more reactive functional groups in each molecule, an organic halide or halogenated sulfonyl compound having two or more initiation sites is preferably used as the initiator. As specific examples, there may be mentioned the following:

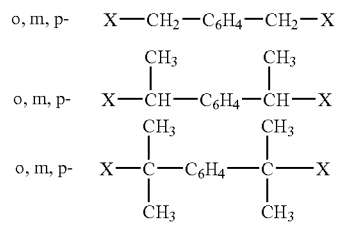

(in the above formulas, $C_6H_4$ is a phenylene group and X is a chlorine, bromine or iodine atom);

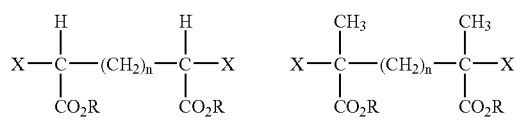

-continued

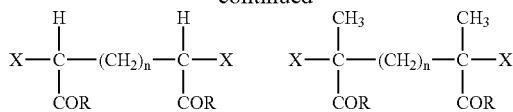

(in the above formulas, R is an alkyl, aryl or aralkyl group containing 1 to 20 carbon atoms, n is an integer of 0 to 20 and X is a chlorine, bromine or iodine atom);

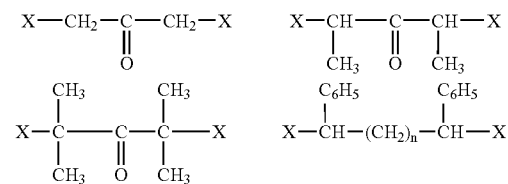

(in the above formulas, X is a chlorine, bromine or iodine atom and n is an integer of 0 to 20);

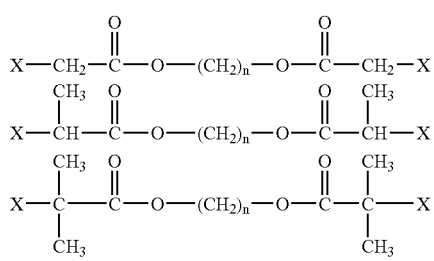

(in the above formulas, n is an integer of 0 to 20 and X is a chlorine, bromine or iodine atom);

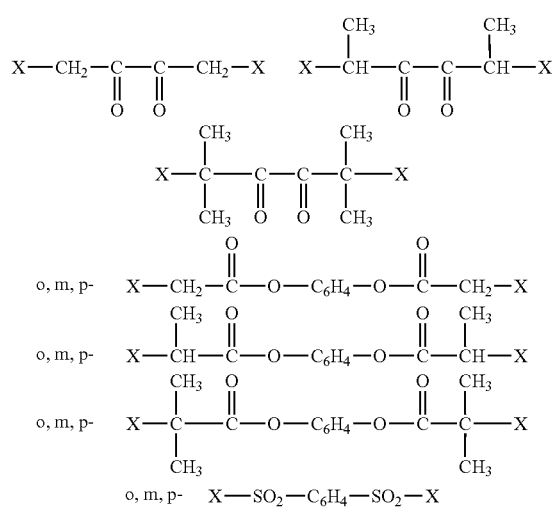

(in the above formulas, X is a chlorine, bromine or iodine atom); etc.

The transition metal complex to be used as the catalyst is not particularly restricted but preferably is a metal complex containing, as the central atom, an element of the group 7, 8, 9, 10 or 11 of the periodic table. More preferred are complexes of zero-valent copper, univalent copper, bivalent ruthenium, bivalent iron or bivalent nickel. Copper complexes are preferred among others. Specific examples of the univalent copper compound are cuprous chloride, cuprous bromide, cuprous iodide, cuprous cyanide, cuprous oxide and cuprous perchlorate. When such a copper compound is used, a ligand such as 2,2'-bipyridyl or a derivative thereof, 1,10-phenanthroline or a derivative thereof or a polyamine compound such as tetramethylethylenediamine, pentamethyldiethylenetriamine or hexamethyltris(2-aminoethyl)amine is added for increasing the catalytic activity. Preferred are triamine compounds. The tristriphenylphosphine complex of bivalent ruthenium chloride ($RuCl_2$ $(PPh_3)_3$) is also suited for use as the catalyst. When such a ruthenium compound is used as the catalyst, an aluminum alkoxide is added as an activator. Furthermore, the bivalent iron-bistriphenylphosphine complex ($FeCl_2(PPh_3)_2$), the bivalent nickel-bistriphenylphosphine complex ($NiCl_2(PPh_3)_2$), and the bivalent nickel-bistributylphosphine complex ($NiBr_2(PBu_3)_2$) are also suited for use as the catalyst.

The vinyl monomer to be used in this polymerization is not particularly restricted but includes, among others, (meth) acrylic monomers such as (meth)acrylic acid, methyl(meth) acrylate, ethyl(meth)acrylate, n-propyl (meth)acrylate, isopropyl (meth)acrylate, n-butyl(meth)acrylate, isobutyl (meth)acrylate, tert-butyl(meth)acrylate, n-pentyl(meth) acrylate, n-hexyl(meth)acrylate, cyclohexyl(meth)acrylate, n-heptyl(meth)acrylate, n-octyl(meth)acrylate, 2-ethylhexyl (meth)acrylate, nonyl(meth)acrylate, decyl (meth)acrylate, dodecyl(meth)acrylate, phenyl (meth)acrylate, toluyl(meth) acrylate, benzyl(meth)acrylate, 2-methoxyethyl(meth)acrylate, 3-methoxybutyl(meth)acrylate, 2-hydroxyethyl(meth) acrylate, 2-hydroxypropyl(meth)acrylate, stearyl(meth) acrylate, glycidyl(meth)acrylate, 2-aminoethyl(meth) acrylate, γ-(methacryloyloxypropyl)trimethoxysilane, (meth)acrylic acid-ethylene oxide adducts, trifluoromethylmethyl(meth)acrylate, 2-trifluoromethylethyl (meth)acrylate, 2-perfluoroethylethyl(meth)acrylate, 2-perfluoroethyl-2-perfluorobutylethyl(meth)acrylate, 2-perfluoroethyl (meth)acrylate, perfluoromethyl(meth)acrylate, diperfluoromethylmethyl(meth)acrylate, 2-perfluoromethyl-2-perfluoroethylmethyl (meth)acrylate, 2-perfluorohexylethyl(meth)acrylate, 2-perfluorodecylethyl(meth)acrylate, and 2-perfluorohexadecylethyl(meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and maleic acid monoalkyl esters and dialkyl esters; fumaric acid, and fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohol, and the like. These may be used singly or a plurality of them may be subjected to copolymerization. From the viewpoint of physical properties of products, among others, styrenic monomers and (meth)acrylic monomers are preferred among others. Acrylic ester monomers and methacrylic ester monomers are more preferred, and acrylic ester monomers are particularly preferred. Butyl acrylate is still more preferred. In the practice of the present invention, these preferred monomers may be copolymerized or, further block-copolymerized, with another monomer and, on that occasion, the content of these preferred monomers is preferably not less than 40% by weight, more preferably not less than 60% by weight. In the above form of expression, "(meth)acrylic acid", for instance, means acrylic acid and/or methacrylic acid.

The polymerization can be carried out without using any solvent and can also be carried out in the presence of various solvents. The solvent is not particularly restricted in kind but includes, among others, hydrocarbon solvents such as benzene and toluene; ether solvents such as diethyl ether, tetrahydrofuran, diphenyl ether, anisole, and dimethoxybenzene; halogenated hydrocarbon solvents such as methylene chloride, chloroform, and chlorobenzene; ketone solvents such as acetone, methyl ethyl ketone, and methyl isobutyl ketone; alcohol solvents such as methanol, ethanol, propanol, isopropanol, n-butyl alcohol, and tert-butyl alcohol; nitrile solvents such as acetonitrile, propionitrile, and benzonitrile; ester solvents such as ethyl acetate and butyl acetate; carbonate solvents such as ethylene carbonate and propylene carbonate; amide solvents such as N,N-dimethylformamide and N,N-dimethylacetamide; and the like. These may be used singly or two or more of them may be used in admixture. It is also possible to carry out the polymerization in an emulsion system or in a system using the supercritical fluid $CO_2$ as the medium.

The polymerization can be carried out within the temperature range of 0 to 200° C., preferably room temperature to 150° C., although the temperature range is not limited to such range.

Re: Vinyl Polymer

The vinyl polymer according to the present invention is now described in detail.

The vinyl polymer is obtainable by atom transfer radical polymerization of a vinyl monomer(s). Such vinyl monomer is not particularly restricted but any of those already given by way of example can be used. Those vinyl monomers may be used singly or a plurality of them may be copolymerized. From the viewpoint of physical properties of products, among others, styrenic monomers and (meth)acrylic monomers are preferred, acrylic ester monomers and methacrylic ester monomers are more preferred, acrylic ester monomers are particularly preferred, and butyl acrylate is still further preferred. In the practice of the present invention, these preferred monomers may be copolymerized or, further, block copolymerized, with another monomer or other monomers and, on such occasion, these preferred monomers preferably account for not less than 40% by weight, more preferably not less than 60% by weight.

The molecular weight distribution, namely the ratio between the weight average molecular weight and number average molecular weight as determined by gel permeation chromatography, of the vinyl polymer is not particularly restricted but preferably is less than 1.8, preferably not more than 1.7, more preferably not more than 1.6, still more preferably not more than 1.5, especially preferably not more than 1.4, most preferably not more than 1.3. In the practice of the present invention, the GPC measurement is generally carried out on a polystyrene gel column using chloroform as a mobile phase, and the number average molecular weight and the like can be determined on the polystyrene equivalent basis.

The number average molecular weight of the vinyl polymer is not particularly restricted but preferably is within the range of 500 to 1,000,000, more preferably 1,000 to 100,000. When the molecular weight is too low, the characteristics intrinsic in vinyl polymers can hardly be manifested and, conversely, when it is excessively high, the polymer becomes difficult to handle.

The vinyl polymer may have a reactive functional group (s) within the molecule. Where it has a reactive functional group(s) within the molecule, the group(s) may occur either on a side chain(s) or at a molecular chain terminus or termini. The reactive functional group is not particularly restricted but includes, among others, alkenyl, hydroxyl, amino and crosslinkable silyl groups, and polymerizable carbon-carbon double bonds. The reactive functional group can also be converted to another appropriate functional group in one or a plurality of steps. For example, alkenyl group-containing vinyl polymers can be synthesized through conversion of a reactive functional group such as a hydroxyl group in the practice of the present invention as well.

Re: Alkenyl Group-containing Vinyl Polymer

Detailed mention is now made of the alkenyl group-containing vinyl polymer. The alkenyl group-containing vinyl polymer can be used as a component in a hydrosilylation-susceptible composition. For example, when subjected to hydrosilylation using a hydrosilyl group-containing compound as a curing agent, a vinyl polymer having at least one alkenyl group within the molecule can be crosslinked to give cured products. When subjected to hydrosilylation with a crosslinkable functional group-containing hydrosilane compound, a vinyl polymer having at least one alkenyl group within the molecule gives a crosslinkable functional group-containing vinyl polymer.

The alkenyl group-containing vinyl polymer can be produced utilizing atom transfer radical polymerization.

In the practice of the present invention, the alkenyl group is not restricted but preferably is one represented by the general formula (6):

$$H_2C=C(R^{13})- \qquad (6)$$

wherein $R^{13}$ represents a hydrogen atom or an organic group containing 1 to 20 carbon atoms.

In the general formula (6), $R^{13}$ is a hydrogen atom or an organic group containing 1 to 20 carbon atoms. The $C_1$–$C_{20}$ organic group is not particularly restricted but preferably is an alkyl group containing 1 to 20 carbon atoms, an aryl group containing 6 to 20 carbon atoms or an aralkyl group containing 7 to 20 carbon atoms, typical examples of which are the following:

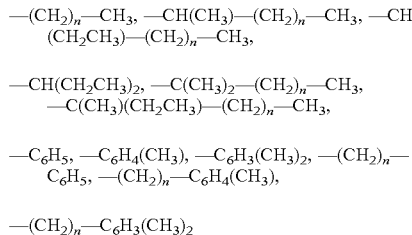

(n being an integer of not less than 0 and the total number of carbon atoms in each group being not more than 20). Among these, a hydrogen atom or a methyl group is more preferred as $R^{13}$.

Further, it is preferred, though not obligatory, that the alkenyl group(s) in the vinyl polymer be not activated by a carbonyl or alkenyl group or an aromatic ring, which is conjugated with the carbon-carbon double bond of the alkenyl group.

The mode of bonding of the alkenyl group to the main chain of the polymer is not particularly restricted but preferably involves carbon-carbon bonding, ester bonding, ether bonding, carbonate bonding, amide bonding, urethane bonding or the like.

The alkenyl group(s) is(are) only required to occur within the molecule of the vinyl polymer. In cases, however, where the cured products derived from the curable composition of the present invention are required to have rubber-like properties, in particular, it is preferred that at least one of the alkenyl groups occur at a molecular chain terminus so that the molecular weight between crosslinking sites, which greatly influences on rubber elasticity, may be designed to be high. More preferably, all alkenyl groups occur at molecular chain termini.

The number of alkenyl groups is not particularly restricted but, for obtaining cured products with a higher degree of crosslinking, it should be, on an average, not less than 1, preferably not less than 1.2, more preferably not less than 1.5.

Several methods of producing the alkenyl group-containing vinyl polymer are mentioned below in detail, without any purpose of restriction, however.

(A-a) A method comprising subjecting to reaction a compound having, in each molecule, a polymerizable alkenyl group together with an alkenyl group of low polymerizability, such as one represented by the general formula (9) shown below, as a second monomer in synthesizing a vinyl polymer by atom transfer radical polymerization:

$$H_2C=C(R^{14})-R^{15}-R^{16}-C(R^{17})=CH_2 \qquad (9)$$

wherein $R^{14}$ represents a hydrogen atom or a methyl group, $R^{15}$ represents —C(O)O— or an o-, m- or p-phenylene group, $R^{16}$ represents a direct bond or a bivalent organic group containing 1 to 20 carbon atoms, which may contain one or more ether bonds, and $R^{17}$ represents a hydrogen atom or an organic group containing 1 to 20 carbon atoms.

In the general formula (9), $R^{17}$ is a hydrogen atom or an organic group containing 1 to 20 carbon atoms. The $C_1$–$C_{20}$ organic group is not particularly restricted but preferably is an alkyl group containing 1 to 20 carbon atoms, an aryl group containing 6 to 20 carbon atoms or an aralkyl group containing 7 to 20 carbon atoms, typical examples of which are the following:

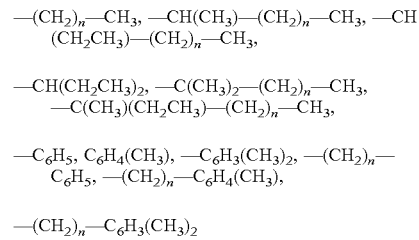

(n being an integer of not less than 0 and the total number of carbon atoms in each group being not more than 20).

Among these, a hydrogen atom or a methyl group is preferred as $R^{17}$.

The time when the compound having, in each molecule, a polymerizable alkenyl group and an alkenyl group of low polymerizability is subjected to reaction is not particularly restricted but, in particular when rubber-like properties are expected of the cured products resulting from curing of the vinyl polymer, the compound is preferably subjected to reaction as a second monomer at the final stage of the polymerization reaction or after completion of the reaction of the main monomer(s).

(A-b) A method comprising subjecting to reaction a compound having at least two alkenyl groups of low polymerizability, for example 1,5-hexadiene, 1,7-octadiene or 1,9-decadiene, at the final stage of the polymerization reaction or after completion of the reaction of the main monomer(s) in vinyl polymer synthesis by atom transfer radical polymerization.

(A-c) A method comprising reacting a vinyl polymer having at least one highly reactive carbon-halogen bond at a terminus thereof as obtained by atom transfer radical polymerization with one of various alkenyl group-containing organometallic compounds, for example an organotin such as allyltributyltin or allyltrioctyltin, for substitution for the halogen.

(A-d) A method comprising reacting a vinyl polymer having at least one highly reactive carbon-halogen bond at a terminus thereof as obtainable by atom transfer radical polymerization with a stabilized, alkenyl group-containing carbanion such as one represented by the general formula (10), for substitution for the halogen:

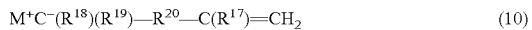

wherein $R^{17}$ is as defined above, $R^{18}$ and $R^{19}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a bivalent organic group containing 1 to 10 carbon atoms, which may contain one or more ether bonds, and $M^+$ represents an alkali metal ion or a quaternary ammonium ion.

The electron-withdrawing group $R^{18}$ and/or $R^{19}$ includes —$CO_2R$ (ester group), —C(O)R (keto group), —$CON(R_2)$ (amide group), —COSR (thioester group), —CN (nitrile group), —$NO_2$ (nitro group) and so on. Particularly preferred are —$CO_2R$, —C(O)R and —CN, however. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group.

(A-e) A method comprising reacting a vinyl polymer having at least one highly reactive carbon-halogen bond at a terminus thereof, obtainable by atom transfer radical polymerization, with a simple substance metal, such as zinc, or an organometallic compound and then reacting the thus-prepared enolate anion with an alkenyl group-containing, electrophilic compound, such as an alkenyl group-containing compound having a leaving group such as a halogen atom or an acetyl group, an alkenyl group-containing carbonyl compound, an alkenyl group-containing isocyanate compound or an alkenyl group-containing acid halide.

(A-f) A method comprising reacting a vinyl polymer having at least one highly reactive carbon-halogen bond at a terminus thereof, obtainable by atom transfer radial polymerization, with an alkenyl group-containing oxy anion or carboxylate anion such as one represented by the general formula (11) or (12), for substitution for the halogen:

wherein $R^{17}$ and $M^+$ are as defined above and $R^{21}$ is a bivalent organic group containing 1 to 20 carbon atoms, which may contain one or more ether bonds;

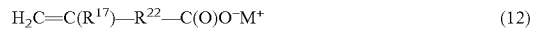

wherein $R^{17}$ and $M^+$ are as defined above and $R^{22}$ is a direct bond or a bivalent organic group containing 1 to 20 carbon atoms, which may contain one or more ether bonds.

Among the methods (A-a) to (A-f), the methods (A-b) and (A-f) are preferred in view of their easier controllability. The introduction methods (A-b) and (A-f) are described below in more detail.

Diene Compound Addition Method [Method (A-b)]

The method (A-b) comprises reacting a vinyl polymer obtainable by atom transfer radical polymerization of a vinyl monomer(s) with a compound having at least two low-polymerizability alkenyl groups (hereinafter referred to as "diene compound").

The two alkenyl groups of the diene compound may be the same or different from each other. Each alkenyl group may be a terminal alkenyl group [$CH_2$=(R)—R'; R is a hydrogen atom or an organic group containing 1 to 20 carbon atoms and R' is an organic group containing 1 to 20 carbon atoms; R and R' may be bound together to form a cyclic structure] or an internal alkenyl group [R'—C(R)=C(R)—R'; R is a hydrogen atom or an organic group containing 1 to 20 carbon atoms and R' is an organic group containing 1 to 20 carbon atoms; the two R groups, or the two R' groups, may be the same or different; any two of the two R and two R' groups may be bound together to form a cyclic structure]. A terminal alkenyl group is preferred, however. R is a hydrogen atom or an organic group containing 1 to 20 carbon atoms. The $C_1$–$C_{20}$ organic group is preferably an alkyl group containing 1 to 20 carbon atoms, an aryl group containing 6 to 20 carbon atoms or an aralkyl group containing 7 to 20 carbon atoms. Among these, a hydrogen atom or a methyl group is particularly preferred as R.

Of the alkenyl groups of the diene compound, at least two alkenyl groups may be conjugated.

As specific examples of the diene compound, there may be mentioned isoprene, piperylene, butadiene, myrcene, 1,5-hexadiene, 1,7-octadiene, 1,9-decadiene, 4-vinyl-1-cyclohexene and the like. Among them, 1,5-hexadiene, 1,7-octadiene and 1,9-decadiene are preferred.

It is also possible to obtain the desired alkenyl-terminated vinyl polymer by carrying out living radical polymerization of a vinyl monomer(s), isolating the resulting polymer from the polymerization system and reacting the thus-isolated polymer with a diene compound in the manner of radical reaction. According to a more preferred procedure, which is simple and easy to perform, the diene compound is added to the polymerization reaction system at the final stage of the polymerization reaction or after completion of the reaction of the main vinyl monomer(s).

It is necessary that the amount of addition of the diene compound be adjusted according to the radical reactivity of each alkenyl group of the diene compound. When there is a great difference in reactivity between the two alkenyl groups, the amount of the diene compound may be equivalent or in a slight excess relative to the growing polymerization termini. When there is little difference in reactivity between the two alkenyl groups, however, the two alkenyl groups both may react and polymerization termini may couple together, so that the diene compound is preferably added in excess, preferably not less than 1.5 times, more preferably not less than 3 times, most preferably not less than 5 times, relative to the growing polymer termini.

Nucleophilic Substitution Method [Method (A-f)]

The method (A-f) is characterized in that a vinyl polymer having at least one highly reactive carbon-halogen bond at a terminus thereof, obtainable by atom transfer radical polymerization, is reacted with an alkenyl group-containing oxy anion or carboxylate anion for substitution for the halogen.

The alkenyl group-containing oxy anion or carboxylate anion is not particularly restricted but includes, among others, those represented by the general formula (11) or (12):

$$H_2C=C(R^{17})-R^{21}-O^-M^+ \quad (11)$$

wherein $R^{17}$ and $M^+$ are as defined above and $R^{21}$ is a bivalent organic group containing 1 to 20 carbon atoms, which may contain one or more ether bonds;

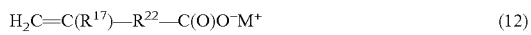
$$H_2C=C(R^{17})-R^{22}-C(O)O^-M^+ \quad (12)$$

wherein $R^{17}$ and $M^+$ are as defined above and $R^{22}$ is a direct bond or a bivalent organic group containing 1 to 20 carbon atoms, which may contain one or more ether bonds.

As specific examples of the oxy anion or carboxylate anion, there may be mentioned, among others, salts of alkenyl alcohols such as allyl alcohol; salts of allyloxy alcohols such as ethylene glycol monoallyl ether; salts of alkenyl group-containing phenolic hydroxyl groups such as allylphenol and allyloxyphenol; salts of alkenyl group-containing carboxylic acids such as 10-undecylenic acid, 4-pentenoic acid and vinylacetic acid; and so forth.

$M^+$ is the counter cation and, as for the species thereof, $M^+$ includes alkali metal ions, specifically the lithium ion, sodium ion and potassium ion, and quaternary ammonium ions. As the quaternary ammonium ions, there may be mentioned the tetramethylammonium ion, tetraethylammonium ion, tetrabenzylammonium ion, trimethyldodecylammonium ion, tetrabutylammonium ion and dimethylpiperidinium ion, etc. The sodium ion and potassium ion are preferred, however.

The oxy anion or carboxylate anion may be used in excess relative to the halogen of vinyl polymer, preferably in an amount of 1 to 5 equivalents, more preferably 1 to 2 equivalents, still more preferably 1.0 to 1.2 equivalents, relative to the halogen.

The solvent to be used in carrying out this reaction is not particularly restricted but preferably is a solvent relatively high in polarity. Thus, for example, there may be mentioned ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide, dimethylacetamide and hexamethylphosphoric triamide; and sulfoxide solvents such as dimethyl sulfoxide. These may be used singly or two or more of them may be used in admixture. Among them, such polar solvents as acetone, dimethyl sulfoxide, dimethylformamide, dimethylacetamide, hexamethylphosphoric triamide and acetonitrile are preferred. The reaction temperature is not particularly restricted but, generally, it is 0 to 150° C., more preferably room temperature to 100° C.

An amine, ammonium salt or crown ether, for instance, may be added to the reaction system as a reaction promoter.

In lieu of an oxy anion or carboxylate anion, an alcohol or carboxylic acid, which is a precursor, may be reacted with a base in the reaction system for preparing the corresponding oxy anion or carboxylate anion.

When an ester group exists on side chains or in the main chain of the vinyl polymer, the use of an oxy anion, which is highly nucleophilic, may possibly lead to occurrence of transesterification and, therefore, the use of a carboxylate anion, which is low in nucleophilicity, is more preferred.

Methods of Converting a Hydroxyl Group to an Alkenyl Group

It is also possible to obtain the vinyl polymer having at least one alkenyl group from a vinyl polymer having at least one hydroxyl group. Utilizable methods include, but are not limited to, the following.

(A-g) A method comprising reacting the hydroxyl group of a vinyl polymer having at least one hydroxyl group with a base, such as sodium methoxide, followed by reaction with an alkenyl group-containing halide, such as allyl chloride.

(A-h) A method comprising reacting the hydroxyl group of a vinyl polymer having at least one hydroxyl group with an alkenyl group-containing isocyanate compound, such as allyl isocyanate.

(A-i) A method comprising reacting the hydroxyl group of a vinyl polymer having at least one hydroxyl group with an alkenyl group-containing acid halide, such as (meth)acrylic acid chloride, or 10-undecenoic acid chloride in the presence of a base, such as pyridine.

(A-j) A method comprising reacting the hydroxyl group of a vinyl polymer having at least one hydroxyl group with an alkenyl group-containing carboxylic acid, such as acrylic acid, pentenoic acid or 10-undecenoic acid, in the presence of an acid catalyst.

(A-k) A method comprising reacting a hydroxyl group-containing vinyl polymer with a diisocyanate compound and then reacting the remained isocyanato group with a compound having both an alkenyl group and a hydroxyl group. The compound having both an alkenyl group and a hydroxyl group is not particularly restricted but includes, among others, alkenyl alcohols such as 10-undecenol, 5-hexenol and allyl alcohol.

The diisocyanate compound is not particularly restricted but may be any of those known in the art, for example toluylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated toluylene diisocyanate, hydrogenated xylylene diisocyanate, isophoronediisocyanate, and like isocyanate compounds. These may be used singly or two or more of them may be used in combination. These may also be used in the form of blocked isocyanates.

For making better use of the excellent weatherability, the use of aromatic ring-free diisocyanate compounds such as hexamethylene diisocyanate and hydrogenated diphenylmethanediisocyanate is preferred.

Methods of Synthesizing Hydroxyl-containing Vinyl Polymers

The method of producing the vinyl polymer having at least one hydroxyl group, which polymer is to be used in the methods (A-g) to (A-j), includes, but is not limited to, the following, among others.

(B-a) A method comprising subjecting to reaction, as a second monomer, a compound having both a polymerizable alkenyl group and a hydroxyl group in each molecule, for example one represented by the general formula (15) given below, in synthesizing the vinyl polymer by atom transfer radical polymerization:

$$H_2C=C(R^{14})-R^{15}-R^{16}-OH \qquad (15)$$

wherein $R^{14}$, $R^{15}$ and $R^{16}$ are as defined above.

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the main monomer(s).

(B-b) A method comprising subjecting an alkenyl alcohol, such as 10-undecenol, 5-hexenol or allyl alcohol, to reaction at the final stage of polymerization reaction or after completion of the reaction of the main monomer(s) in synthesizing the vinyl polymer by atom transfer radical polymerization.

(B-c) A method comprising introducing a terminal hydroxyl group(s) by hydrolyzing the halogen atom(s) of a vinyl polymer having at least one highly reactive carbon-halogen bond at a terminus thereof, obtainable by atom transfer radical polymerization, or reacting such halogen atom(s) with a hydroxyl-containing compound.

(B-d) A method comprising reacting a vinyl polymer having at least one highly reactive carbon-halogen bond at a terminus thereof, obtainable by atom transfer radical polymerization, with a hydroxyl-containing stabilized carbanion, such as one represented by the general formula (16), for substitution for the halogen atom:

$$M^+C^-(R^{18})(R^{19})-R^{20}-OH \qquad (16)$$

wherein $R^{18}$, $R^{19}$, $R^{20}$ and $M^+$ are as defined above.

The electron-withdrawing groups $R^{18}$ and $R^{19}$ include —$CO_2R$ (ester group), —C(O)R (keto group), —CON($R^2$) (amide group), —COSR (thioester group), —CN (nitrile group) and —$NO_2$ (nitro group), among others. Particularly preferred are —$CO_2R$, —C(O)R and —CN, however. The substituent R is an alkyl group containing 1 to 20 carbon atoms, an aryl group containing 6 to 20 carbon atoms or an aralkyl group containing 7 to 20 carbon atoms, preferably an alkyl group containing 1 to 10 carbon atoms or a phenyl group.

(B-e) A method comprising reacting a vinyl polymer having at least one highly reactive carbon-halogen bond at a terminus thereof as obtained by atom transfer radical polymerization with a simple substance metal, such as zinc, or an organometallic compound and then reacting the thus-prepared enolate anion with an aldehyde or ketone.

(B-f) A method comprising reacting a vinyl polymer having at least one highly reactive carbon-halogen bond at a terminus thereof as obtained by atom transfer radical polymerization with a hydroxyl-containing oxy anion or carboxylate anion, such as one represented by the general formula (17) or (18) given below, for substitution for the halogen atom:

$$HO-R^{21}-O^-M+ \qquad (17)$$

wherein $R^{21}$ and $M^+$ are as defined above;

$$HO-R^{22}-C(O)O^-M^+ \qquad (18)$$

wherein $R^{22}$ and $M^+$ are as defined above.

As for the $M^+$, reaction conditions, solvent and so on, those described with respect to (A-f) can all appropriately be employed.

(B-g) A method comprising subjecting, as a second monomer, a compound having an alkenyl group of low polymerizability and a hydroxyl group in each molecule to reaction at the final stage of the polymerization reaction or after completion of the reaction of the main monomer(s) in synthesizing the vinyl polymer by atom transfer radical polymerization. Such compound is not particularly restricted but may be a compound represented by the general formula (19), for instance:

$$H_2C=C(R^{14})-R^{21}-OH \qquad (19)$$

wherein $R^{14}$ and $R^{21}$ are as defined above.

The compound represented by the above general formula (19) is not particularly restricted but, in view of ready availability, alkenyl alcohols such as 10-undecenol, 5-hexenol and allyl alcohol are preferred.

Among the synthetic methods (B-a) to (B-g), the methods (B-b) and (B-f) are preferred because of easier controllability.

Re: Halogen Group Treatment Step

In the practice of the present invention, it is also possible to remove the halogen group remained in the vinyl polymer therefrom by carrying out a substitution reaction using a nucleophilic reagent.

The halogen group-containing vinyl polymer is, for example, a vinyl polymer obtainable by carrying out atom transfer radical polymerization using an organic halide or halogenated sulfonyl compound as an initiator and having a terminal structure represented by the general formula (1):

$$-C(R^1)(R^2)(X)- \qquad (1)$$

wherein $R^1$ and $R^2$ each represents a group bound to the ethylenically unsaturated group of a vinyl monomer and X represents a chlorine, bromine or iodine atom.

The vinyl polymer obtainable by the above-described diene compound addition method [method (A-b)] also has such a halogen group. For example, when $$CH_2=CH-R-CH=CH_2$$

(in which R is a saturated hydrocarbon group containing 1 to 10 carbon atoms) is used, a vinyl polymer having the following molecular terminus is obtained:

$$-C(R^1)(R^2)-CH_2-CH(X)-R-CH=CH_2$$

wherein R is a saturated hydrocarbon group containing 1 to 10 carbon atoms.

As the nucleophilic reagent, there may be mentioned those oxy anions and carbanions having a functional group such as an alkenyl group or a hydroxyl group which have already mentioned hereinabove by way of example. When these nucleophilic reagents are used, it is possible to simultaneously realize halogen group treatment and functional group introduction into the vinyl polymer. In cases where only halogen group elimination is intended and there is no need of particular introduction of a functional group such as an alkenyl or hydroxyl group, however, a carboxylic acid salt such as an acetic acid salt or benzoic acid salt may be used. Potassium acetate, sodium acetate, potassium benzoate and sodium benzoate are more preferred as the nucleating reagent in view of their availability.

As for the nucleophilic substitution reactions, those reactions mentioned above referring to the nucleophilic substitution method [method (A-f)] may be used as they are.

Re: Adsorption Treatment

The adsorption treatment method is now described in detail.

The adsorption treatment method according to the present invention is a method of purifying a vinyl polymer by bringing the vinyl polymer into contact with an adsorbent, which method comprises using an acid adsorbent and a basic adsorbent combinedly. The adsorption treatment method according to the present invention also serves as a method of purifying a vinyl polymer for using the vinyl polymer as a component of a hydrosilylation-susceptible composition.

The transition metal and the ligand added for increasing the polymerization activity of the metal, which are used in the step of polymerization, both become polymer discoloration causing substances. Further, these act as catalyst poisons in the hydrosilylation reaction. The ligand, which is a basic compound, is preferably removed bymeans of an acidic adsorbent. A basic adsorbent shows high adsorptivity against transition metals. Therefore, the both substances can be removed efficiently by using an acidic adsorbent and a basic adsorbent combinedly and, as compared with the single use of an acidic adsorbent or a basic adsorbent, the transition metal complex used in the step of polymerization little remains in the vinyl polymer obtained, and the amount of a hydrosilylation/curing catalyst can be reduced in curing a hydrosilylation-susceptible composition comprising the vinyl polymer.

According to the present invention, an acidic adsorbent and a basic adsorbent are used each as the adsorbent. The term "acidic (or basic) adsorbent" as used herein is defined as "an adsorbent capable of adsorbing a basic compound (or acidic compound in the case of a basic adsorbent)" or "an adsorbent capable of functioning as a cation (anion in the case of a basic adsorbent) exchanger".

The adsorbent includes activated carbon, ion exchange resins, other synthetic resin adsorbents, zeolite and other inorganic adsorbents, among others. All of these can judiciously be used.

Activated carbon is a mostly carbonaceous charcoal and is high in adsorptivity. As for the method of production thereof, wood, brown coal, or peat, for instance, is treated with zinc chloride or phosphoric acid, for instance, as an activator, followed by dry distillation, or charcoal or the like is activated by means of steam. Generally, it has the form of powder or granules, and either form can be used. According to the activated carbon production process, chemically-activated carbon species show acidity and essentially steam-activated carbon species show basicity.

Ion exchange resins can be used as synthetic resin adsorbents. Those acidic and basic ion exchange resins in general use may be used as the ion exchange resins. Chelate type ion exchange resins may also be used. As examples of the functional group of acidic ion exchange resins, there may be mentioned carboxylic acid and sulfonic acid groups, among others. As examples of the functional group of basic ion exchange resins, there may be mentioned amino groups, among others. As examples of the functional group of chelate type ion exchange resins, there may be mentioned iminodiacetic acid and polyamine groups, among others.

Inorganic adsorbents generally comprise a solid acid or solid base, and particles thereof have a porous structure and, therefore, they are very high in adsorptivity. One of the characteristic features thereof is tat they can be used at low temperatures to elevated temperatures. While the inorganic adsorbents are not particularly restricted, representative species comprise, either singly or in combination, aluminum, magnesium, silicon and/or the like as main component(s). Examples are silicon dioxide; magnesium oxide; silica gel; silica-alumina, aluminum silicate; magnesium silicate; activated alumina, aluminum hydroxide; acidic terra alba, activated terra alba, and like clay adsorbents; sodium aluminum silicate and like zeolite adsorbents collectively called hydrate aluminosilicate minerals; dawsonite compounds; and hydrotalcites, among others.

Zeolites include natural products and synthetic products. Either of them may be used.

Silicon dioxide includes crystalline, amorphous, noncrystalline, glass-like, synthetic and natural species. Any of them can be used here if occurring in a powder form. Thus, silicon dioxide includes, but is not limited to, silicic acid products derived from clay minerals obtainable by acid treatment of activated terra alba, and synthetic silicic acid species such as Carplex BS304, Carplex BS304F, Carplex #67 and Carplex #80 (all available from Shionogi & Co., Ltd.).

Aluminum silicates are derived from silicic acid by partial substitution of aluminum atoms for silicon atoms, and known species include pumice, fly ash, kaolin, bentonite, activated terra alba, and diatomaceous earth, among others. Synthetic aluminum silicates are large in specific surface area and high in adsorptivity. Synthetic aluminum silicates include, but are not limited to, Kyowaad 700 series products (products of Kyowa Chemical).

Hydrotalcites include hydrate hydroxides of a bivalent metal (e.g. $Mg^{2+}$, Mn2+, $Fe^{2+}$, $Co^{2+}$, $Ni^{2+}$, $Cu^{2+}$, $Zn^{2+}$) and a trivalent metal (e.g. $Al^{3+}$, $Fe^{3+}$, $Cr^{3+}$, $Co^{3+}$, $In^{3+}$) and derivatives of such hydroxides as obtained by partial exchange of anions such as halogen ions, $NO_3^-$, $CO_3^{2-}$, $SO_4^{2-}$, $Fe(CN)_6^{3-}$, $CH_3CO_2^-$, oxalic ion, and salicylic acid ion for hydroxyl groups thereof. Species preferred among these include, but are not limited to, hydrotalcites in which the bivalent metal is $Mg^{2+}$, the trivalent metal is $Al^{3+}$ and hydroxyl groups thereof have partly been exchanged for $CO_3^{2-}$ groups, for example synthetic products such as Kyowaad 500 series and Kyowaad 1000 series products (all being products of Kyowa Chemical). Those adsorbents obtained by calcining such hydrotalcites are also suited for use. Species preferred among them include, but are not limited to, MgO—$Al_2O_3$-based solid solutions obtainable by calcining those hydrotalcites in which the bivalent metal is $Mg^{2+}$ and the trivalent metal is $Al^{3+}$, for example Kyowaad 2000 (product of Kyowa Chemical). In accordance with the present invention, such calcined hydrotalcites are also classified as hydrotalcites.

An adsorbent comprising both a solid acid and a solid base may be used instead of the combined use of an acidic adsorbent and a basic adsorbent. As such adsorbent, there may be mentioned magnesium silicates. Magnesium silicates are composed of a solid acid and a solid base and can adsorb both acids and bases. Such magnesium silicates include, but are not limited to, Kyowaad 600s ($2MgO.6SiO_2.xH_2O$; product of Kyowa Chemical) and Mizukalife P-1G (product of Mizusawa Industrial Chemicals), among others. Kyowaad 600s is capable of adsorbing both acids and bases and therefore can be classified as an acidic adsorbent and at the same time as a basic adsorbent whereas Mizukalife P-1G is higher in adsorptivity for bases and therefore classified as an acidic adsorbent.

Aluminum hydroxide is amphoteric and capable of adsorbing bases under certain conditions. However, it is an adsorbent mainly for acids, hence is classified as a basic adsorbent.

$Al(OH)_3 \cdot NaHCO_3$, which is also known as dawsonite, is classified as a basic adsorbent.

Thus, acidic inorganic adsorbents include, amongothers, acid terra alba, activated terra alba, aluminum silicates, silica gel, and the like. Basic inorganic adsorbents include, among others, magnesium oxide, activated alumina, zeolite adsorbents collectively called hydrate aluminosilicate minerals, such as sodium aluminum silicate, and hydrotalcites.

Among those mentioned above, inorganic adsorbents are preferred as the adsorbent to be used in adsorption treatment of the vinyl polymer. Preferred among them as acidic adsorbents are acidic terra alba, activated terra alba and aluminum silicates. Activated terra alba and aluminum silicates are more preferred, and aluminum silicates are most preferred. Preferred as basic adsorbents are activated alumina, zeolite adsorbents collectively called hydrate aluminosilicate minerals, such as sodium aluminum silicate, and hydrotalcites. Activated alumina and hydrotalcites are more preferred, and hydrotalcites are most preferred.

The adsorbents may be used singly or two or more of them may be used in admixture.

The vinyl polymer produced by atom transfer radical polymerization can be purified by bringing the same into contact with an acidic adsorbent and a basic adsorbent. The polymer may be contacted with a mixture of an acidic adsorbent and a basic adsorbent or with the respective adsorbents in separate steps. For example, when a substitution reaction is carried out using a nucleophilic reagent in such a halogen group treatment step as mentioned below, or when no solvent is used or dilution is made with a solvent, it is possible to bring the polymer into contact with one of an acidic adsorbent and a basic adsorbent in such step and with the other in another step.

When a substitution reaction is carried out using a nucleophilic reagent in the halogen group treatment step, a halide corresponding to the counter cation is formed. For example, when a carboxylic acid alkali metal salt is used as the nucleophilic reagent, an alkali metal halide is formed. In such case, the vinyl polymer after nucleophilic substitution reaction can be contacted with an adsorbent(s) without separating the above halide, namely in the presence thereof. Thereby, the halide removal step can be omitted.

The vinyl polymer produced by atom transfer radical polymerization may be brought into contact with an adsorbent(s) without using any solvent, or after dilution with a solvent, or after distilling off the solvent by concentrating the reaction mixture. From the solvent recycling viewpoint, among others, it is preferred that the vinyl polymer concentration is as high as possible, and a solvent-free state is most preferred. When, however, the vinyl polymer is high in viscosity and thus difficult to handle, for instance, the polymer may be contacted with the adsorbent(s) in a solution state resulting from dilution with a small amount of a solvent. In that case, the concentration of the vinyl polymer is preferably not less than 60% by weight, more preferably not less than 70% by weight, still more preferably not less than 80% by weight, most preferably not less than 90% by weight. The dilution solvent may be any of those in general use.

The adsorption treatment temperature is not particularly restricted but, recommendably, the treatment is carried out generally at 0° C. to 200° C., preferably at room temperature to 180° C. When no solvent is used, the treatment is preferably carried out at a higher temperature, generally within the range of 0° C. to 250° C., preferably room temperature to 200° C., more preferably 100° C. to 180° C.

In view of the economy and operability, it is necessary that the adsorbent be used in an amount within the range of 0.01 to 10 parts by weight, preferably 0.1 to 10 parts by weight, more preferably 0.5 to 10 parts by weight, still more preferably 0.5 to 5 parts by weight, most preferably 0.5 to 2 parts by weight, per 100 parts by weight of the vinyl polymer.

The solid-liquid contacting between the adsorbent(s) and the polymer or polymer solution can be effected in various modes of embodiment. Thus, in addition to the batchwise procedure in which the operations of stirring/mixing and solid-liquid separation are carried out batchwise, the fixed bed system in which the polymer solution is passed through an adsorbent packed in a vessel, the moving bed system in which the polymer solution is passed through a moving adsorbent bed, and the fluidized bed system in which the adsorbent is fluidized by means of the liquid phase to thereby effect the adsorption, among others, can also be utilized. In addition to mixing and dispersion by stirring, it is further possible to employ, if necessary, various procedures for improving the dispersion efficiency, for example shaking of the vessel, utilization of ultrasonic waves, and so on.

After contacting of the polymer or polymer solution with the adsorbent(s), the adsorbent(s) is(are) removed by such a method as filtration, centrifugation or sedimentation, if necessary followed by dilution and/or washing with water, whereby the desired clear polymer solution can be obtained.

While it is necessary only that the final product vinyl polymer is subjected to the adsorption treatment, that treatment may also be applied to the intermediate for the production of the vinyl polymer. In the case of an alkenyl group-containing vinyl polymer obtained by atom transfer radical polymerization, for instance, the polymer itself as well as vinyl polymers to serve as intermediates for the production of that polymer, for example a highly reactive carbon-halogen bond-containing vinyl polymer and a hydroxyl group-containing vinyl polymer, can be subjected to that adsorption treatment.

Hydrosilylation Reaction-susceptible Composition

The hydrosilylation reaction-susceptible composition according to the present invention contains the vinyl polymer after the above-mentioned adsorption treatment.

The hydrosilylation reaction-susceptible composition of the present invention is, for example, a hydrosilylation reaction-susceptible composition comprising (A) a vinyl polymer and (B) a hydrosilyl group-containing compound.

The A component vinyl polymer is a vinyl polymer obtainable by utilizing the above-described atom transfer radical polymerization, preferably a vinyl polymer having an alkenyl group(s) within the molecule thereof, and may be any of those mentioned hereinabove. The B component hydrosilyl group-containing compound is not particularly restricted but may be any of various species. Thus, it includes, among others, compounds having at least 1.1 hydrosilyl groups within the molecule, and hydrosilane compounds having a crosslinkable silyl group(s) as well. Specific hydrosilylation reaction-susceptible compositions are shown below.

<Hydrosilylation Reaction-susceptible Composition (1)>

When the B component is a compound having at least 1.1 hydrosilyl groups within the molecule, the composition gives cured products as a result of hydrosilylation. Thus, the hydrosilylation reaction-susceptible composition is a curable composition (curable composition (1)).

Such compound having at least 1.1 hydrosilyl groups within the molecule is not particularly restricted but include, among others, linear polysiloxanes represented by the general formula (22) or (23):

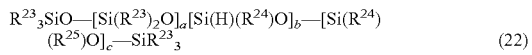
(22)

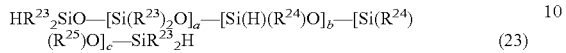
(23)

wherein $R^{23}$ and $R^{24}$ each represents an alkyl group containing 1 to 6 carbon atoms or a phenyl group, $R^{25}$ represents an alkyl, phenyl or aralkyl group containing 1 to 10 carbon atoms, and a, b and c each represents an integer satisfying the relation $0 \leq a \leq 100$, $2 \leq b \leq 100$ and $0 \leq c \leq 100$; cyclic siloxanes represented by the general formula (24):

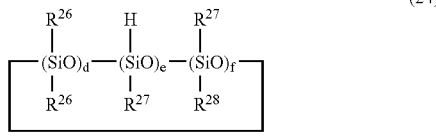
(24)

wherein $R^{26}$ and $R^{27}$ each represents an alkyl group containing 1 to 6 carbon atoms or a phenyl group, $R^{28}$ represents an alkyl, phenyl or aralkyl group containing 1 to 10 carbon atoms and, when there are two or more $R^{26}$ and/or $R^{27}$ groups, they may be the same or different; and d, e and f each represents an integer satisfying the relation $0 \leq d \leq 8$, $2 \leq e \leq 10$ or $0 \leq f \leq 8$ provided that the relation $3 \leq d+e+f \leq 10$ should be satisfied); and so forth.

These may be used singly or two or more of them may be used in admixture. Among these siloxanes, phenyl-containing linear siloxanes represented by the general formula (25) or (26) shown below and cyclic siloxanes represented by the general formula (27) or (28) given below are preferred from the viewpoint of compatibility with (meth)acrylic polymers.

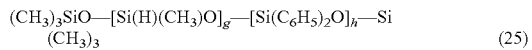
(25)

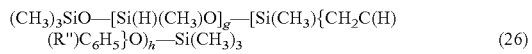
(26)

(in the above formulas, R" represents a hydrogen atom or a methyl group, g and h each represents an integer satisfying the relation $2 \leq g \leq 100$ or $0 \leq h \leq 100$; and $C_6H_5$ represents a phenyl group.)

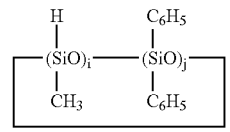
(27)

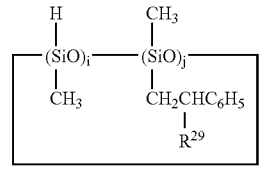
(28)

(in the above formulas, $R^{29}$ represents a hydrogen atom or a methyl group, i and j each represents an integer satisfying the relation $2 \leq i \leq 10$ or $0 \leq j \leq 8$ with the condition $3 \leq i+j \leq 10$; and $C_6H_5$ represents a phenyl group.)

Further usable as the compound containing at least 1.1 hydrosilyl groups in the B component are compounds obtainable by subjecting a low-molecular-weight compound having two or more alkenyl groups within the molecule and a hydrosilyl group-containing compound represented by any of the general formulas (22) to (28) to addition reaction in a manner such that the hydrosilyl group partially remains even after reaction. Various compounds can be used as the compound having two or more alkenyl groups within the molecule. Examples are hydrocarbon compounds such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3'-diallylbisphenol A, ester compounds such as diallyl phthalate, diallyl isophthalate, triallyl trimellitate and tetraallyl pyromellitate, and carbonate compounds such as diethylene glycol diallyl carbonate.

The above compounds can be obtained by slowly adding dropwise the above alkenyl group-containing compound to an excess of the hydrosilyl group-containing compound represented by one of the general formulas (22) to (28) shown above in the presence of a hydrosilylation catalyst. Among such compounds, the following ones are preferred in view of the ready availability of raw materials, the ease of removal of the siloxane used in excess and, further, the compatibility with the vinyl polymer:

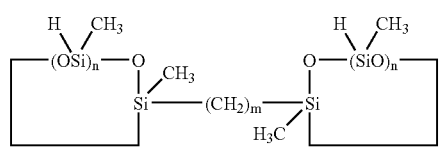

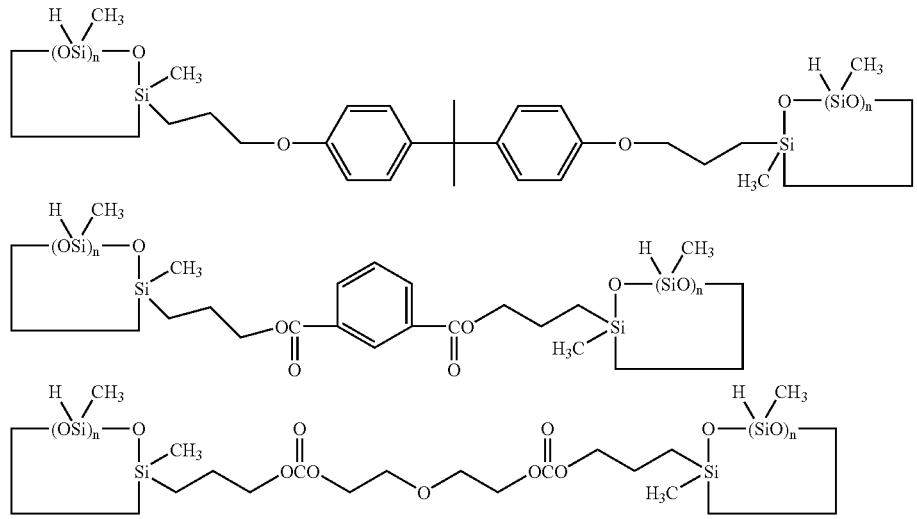

-continued (n being an integer of 2 to 4 and m being an integer of 5 to 10).

The A component vinyl polymer and the B component hydrosilyl group-containing compound can be blended in an arbitrary mixing ratio. From the curability viewpoint, however, the mole ration between the alkenyl and hydrosilyl groups is preferably within the range of 5 to 0.2, more preferably 2.5 to 0.4. When the mole ratio is about 5, the curing tends to become insufficient and give sticky cured products, which is low in strength. When the mole ratio is smaller than 0.2, the active hydrosilyl group tends to remain in large amounts in the cured products even after curing, readily causing the formation of cracks and voids, and thus tends to make it difficult to obtain uniform and strong cured products.

The curing reaction between the A component vinyl polymer and the B component hydrosilyl group-containing compound proceeds when the two components are mixed up and heated. For increasing the rate of reaction, a hydrosilylation catalyst can be added. Such hydrosilylation catalyst is not particularly restricted but may be a radical initiator such as an organic peroxide or azo compound, or a transition metal catalyst, for instance.

The radical initiator is not particularly restricted but includes, among others, dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and α,α'-bis(t-butylperoxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as t-butyl perbenzoate, peroxydicarbonates such as diisopropyl peroxydicarbonate and di-2-ethylhexyl peroxydicarbonate, and peroxyketals such as 1,1-di(t-butylperoxy)cyclohexane and 1,1-di(t-butylperoxy)-3,3,5-trimethylcyclohexane.

The transition metal catalyst is not particularly restricted, either, but includes, among others, simple substance platinum, solid platinum dispersed on/in a carrier such as alumina, silica or carbon black, chloroplatinic acid, complexes of chloroplatinic acid with alcohol, aldehyde, ketone, or the like compound, platinum-olefin complexes, and platinum (0)-divinyltetramethyldisiloxane complex. As other catalysts than platinum compounds, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$ and TiCl$_4$, among others. These catalysts may be used singly or two or more of them may be used in combination. The amount of the catalyst is not particularly restricted but recommendably is within the range of $10^{-1}$ to $10^{-8}$ mole, preferably within the range of $10^{-3}$ to $10^{-6}$ mole, per mole of the alkenyl group in the component (A). When it is smaller than $10^{-8}$ mole, the curing tends to proceed only to a satisfactory extent. Since the hydrosilylation catalyst is generally expensive and corrosive and may cause, in some cases, generation of a large amount of hydrogen gas, hence foaming of cured products, it is preferred that an amount thereof exceeding $10^{-1}$ mole be not used.

The curing temperature is not particularly restricted but it is recommended that the curing be carried out generally at 0° C. to 200° C., preferably 30° C. to 150° C., more preferably 80° C. to 150° C. In this way, the curable composition can be cured in a short period of time.

<Hydrosilylation Reaction-susceptible Composition (2)>

A hydrosilane compound having a crosslinkable silyl group additionally may be used as the hydrosilyl group-containing compound of the B component.

The crosslinkable silyl group-containing hydrosilane compound is not particularly restricted but includes, as typical examples, compounds represented by the general formula (29)

$$\text{H—[Si}(R^{11})_{2-b}(Y)_b\text{O]}_m\text{—Si}(R^{12})_{3-a}(Y)_a \tag{29}$$

wherein $R^{11}$ and $R^{12}$ each represents an alkyl group containing 1 to 20 carbon atoms, an aryl group containing 6 to 20 carbon atoms, an aralkyl group containing 7 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more $R^{11}$ or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2 and m is an integer of 0 to 19, provided that the relation a+mb≧1 should be satisfied.

As the hydrolyzable group, there may be mentioned, among others, a hydrogen atom and those groups which are in general use, for example alkoxy, acyloxy, ketoxinate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydrolyzable groups and/or hydroxy groups can be bound to each silicon atom, and it is preferred that (a+Σb) is within the range of 1 to 5. When there are two or more hydrolyzable groups or hydroxyl groups bound in one crosslinkable silyl group, they may be the same or different. The number of silicon atoms forming the crosslinkable silyl group is not less than 1 and, in the case of silicon atoms connected by siloxane or like bonding, it is preferably not more than 20.

Particularly preferred among those hydrosilane compounds in view of ready availability are crosslinkable group-containing compounds represented by the general formula (30):

$$H-Si(R^{12})_{3-a}(Y)_a \quad (30)$$

wherein $R^{12}$, Y and a are as defined above.

When a hydrosilylation reaction-susceptible composition in which the above-described hydrosilane compound is used as the B component undergoes hydrosilylation, a vinyl polymer having a crosslinkable silyl group(s) within the molecule can be obtained.

Such vinyl polymer having at least 1.1 crosslinkable Silyl groups in each molecule can be crosslinked to give cured products. The vinyl polymer having at least 1.1 crosslinkable silyl groups as obtained by the above process as well as a curable composition (curable composition (2)) comprising such vinyl polymer also constitutes an aspect of the present invention.

As the crosslinkable silyl groups to be used in the practice of the present invention, there maybe mentioned groups represented by the general formula (31):

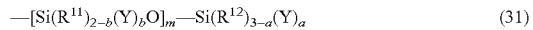

$$-[Si(R^{11})_{2-b}(Y)_bO]_m-Si(R^{12})_{3-a}(Y)_a \quad (31)$$

wherein, $R^{11}$ and $R^{12}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^{11}$ or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19, provided that the relation a+mb≧1 should be satisfied.

As the hydrolyzable group, there may be mentioned, among others, a hydrogen atom and those groups which are in general use, for example alkoxy, acyloxy, ketoxinate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydrolyzable groups and/or hydroxyl groups can be bound to each silicon atom, and it is preferred that (a+Σb) is within the range of 1 to 5. When there are two or more hydrolyzable groups or hydroxyl groups bound in one crosslinkable silyl group, they may be the same or different. The number of silicon atoms forming the crosslinkable silyl group is not less than 1 and, in the case of silicon atoms connected by siloxane or like bonding, it is preferably not more than 20. Especially preferred are crosslinkable silyl groups represented by the general formula (32):

$$-Si(R^{12})_{3-a}(Y)_a \quad (32)$$

wherein $R^{12}$, Y and a are as defined above, because of their ready availability.

When the cured products resulting from curing of the crosslinkable silyl group-containing vinyl polymer according to the present invention are required to have rubber-like properties, in particular, it is preferred that at least one of the crosslinkable silyl groups occur at a molecular chain terminus in order that the molecular weight between crosslinking sites, which greatly influences on the rubber elasticity, may be designed to be high. More preferably, the polymer has all functional groups at molecular chain termini.

The mixing ratio between the A component vinyl polymer and the crosslinkable silyl group-containing hydrosilane compound as the B component is not particularly restricted but it is preferred that the hydrosilyl group content be at least equivalent to the alkenyl group content.

For causing the hydrosilylation reaction to proceed more rapidly, a hydrosilylation catalyst may be added. Such hydrosilylation catalyst may be any of those already mentioned hereinabove by way of example.

The reaction temperature is not particularly restricted but generally is 0° C. to 200° C., preferably 30° C. to 150° C., more preferably 80° C. to 150° C.

In curing the curable composition (2), a condensation catalyst may be used or may not be used. Thus, use as the condensation catalyst may be made, according to need, of one or more of the following: titanates such as tetrabutyl titanate and tetrapropyl titanate; organotin compounds such as dibutyltin dilaurate, dibutyltin diacetylacetonate, dibutyltin maleate, dibutyltin diacetate, dibutyltin dimethoxide, stannous octylate, and stannous naphthenate; lead octylate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, and 1,3-diazabicyclo[5.4.6]undecene-7, or salts of these amine compounds with carboxylic acids; amine compound-organotin compound reaction products and mixtures, for example a laurylamine-stannous octylate reaction product or mixture; low-molecular-weight polyamide resins obtainable from a polyamine in excess and a polybasic acid; reaction products from a polyamine in excess and an epoxy compound; amino group-containing silane coupling agents such as γ-aminopropyltrimethoxysilane and N-(β-aminoethyl)aminopropylmethyldimethoxysilane; and other known silanol condensation catalysts. The amount of addition is preferably 0 to 10% by weight relative to the crosslinkable silyl group-terminated vinyl polymer. When the hydrolyzable group Y is an alkoxy group, the corresponding polymer, when used alone, shows a slow rate of curing, so that a curing catalyst is preferably used.

<Curable Composition>

In the above curable composition (1) and curable composition (2), there maybe incorporate various additives for physical property modification, for example flame retardants, antioxidants, fillers, plasticizers, physical property modifiers, reactive diluents, adhesiveness-providing agents, storage stability-improving agents, solvents, radical inhibitors, metal deactivators, antiozonants, phosphorus-containing peroxide decomposing agents, lubricants, pigments, foaming, agents, photocurable resins and the like. These additives may be used singly or two or more of them may be used in combination.

Since the vinyl polymer is excellent in nature in durability, hence the use of an antioxidant is not always necessary. However, any of those antioxidants, ultraviolet absorbers, light stabilizers and the like which are known in the art can be used each in an appropriate amount.

<Fillers>

The filler which can be incorporated is not particularly restricted but includes, among others, finely powdered silica, calcium carbonate, talc, titanium oxide, diatomaceous earth, barium sulfate, carbon black, surface-treated finely divided calcium carbonate, calcined clay, clay and activated zinc white and like reinforcing fillers, which are used for providing strength and other physical features. These reinforcing fillers may be used singly or two or more of them may be used in combination. Among them, finely powdered silica species are preferred. Thus, hydrous silica obtainable by the wet process or the like, and dryprocess silica obtainable by the dryprocess or the like can be used, among others. Among them, anhydrous silica is particularly preferred since when the composition has high moisture content, side reactions and the like may possibly occur in the curing reaction step. Furthermore, hydrophobically surface-treated anhydrous silica is particularly preferred since such can readily provide flowability suited for molding. In addition, fillers not so outstanding in reinforcing ability may also be used for extension or physical property modification.

<Plasticizer>

The plasticizer which can be incorporated is not particularly restricted but, according to the purpose of addition, for example adjustment of physical properties and/or adjustment of other properties, use can be made of one or a mixture of two or more of phthalates such as dibutyl phthalate, diheptyl phtbalate, di(2-ethylhexyl) phthalate and butyl beuzyl phtbalate; nonaromatic dibasic carboxylates such as dioctyl adipate, dioctyl sebacate, dibutyl sebacate and isodecyl succinate; fatty acid esters such as butyl oleate and methyl acetyiricinolate; polyalkylene glycol esters such as diethylene glycol dibeuzoate, triethylene glycol dibenzoate and pentaerytbritol esters; phosphates such as tricresyl phosphate and tributyl phosphate; trimellitates; polystyrenes such as polystyrene and poly α-methylstyrene; polybutadiene, polybutene, polyisobutylene, butadiene-acrylonitrile copolymers, polychloroprene; chlorinated paraffins; hydrocarbon oils such as alkyldiphenyls and partially hydrogenated terphenyl; process oils; polyethers such as polyethylene glycol, polypropylene glycol, polytetramethylene glycol and like polyether polyols and derivatives of these polyether polyols as resulting from conversion of hydroxyl groups thereof to ester, ether and/or like groups; epoxy plasticizers such as epoxidized soybean oil and benzyl epoxystearate; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; and vinyl polymers obtainable by polymerizing a vinyl monomer(s) by various methods, typically acrylic plasticizers, among others, although these are not always necessary. It is also possible to incorporate these plasticizers in the process of polymer production.

<Storage Stability-improving Agent>

The storage stability-improving agent which can be incorporated is not particularly restricted but may by any one that can prevent the viscosity of the resulting composition from increasing during storage and prevent the curing rate from markedly changing after storage. For example, there may be mentioned benzothiazole and dimethyl maleate.

<Solvent>

As examples of the solvent which can be incorporated, there may be mentioned aromatic hydrocarbon solvents such as toluene and xylene, ester solvents such as ethyl acetate, butyl acetate, amyl acetate and celiosolve acetate, and ketone solvents such as methyl ethyl ketone, methyl isobutyl ketone and diisobutyl ketone, among others. These solvents may also be used in the step of polymer production.

<Adhesiveness-providing Agent>

The adhesiveness-providing agent to be incorporated is not particularly restricted but may be any of those capable of providing the cured products with adhesive properties. A crosslinkable silyl group-containing compound is preferred, however, and a silane coupling agent is more preferred. As specific examples thereof, there may be mentioned alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane and methyltriisopropenoxysilane; vinyl type unsaturated group-containing silanes such as vinyltrimethoxysilane, vinyldimethylmethoxysilane, vinyltriethoxysilane, γ-methacryloyloxypropylmethyldimethoxysilane and γ-acryloyloxypropylmethyltriethoxysilane; silicone vanishes; polysiloxanes and so forth.

Among them, silane coupling agents having, within the molecule, both a crosslinkable silyl group and an organic group having an atom(s) other than carbon and hydrogen atoms, for example an epoxy group, (meth)acrylic group, isocyanato group, isocyanurate group, carbamate group, amino group, mercapto group, carboxyl group or halogen group, are preferred. As specific examples thereof, there may be mentioned are epoxy group-containing alkoxysilanes such as γ-glycidoxypropylmethyldimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-glycidoxypropylmethyldiisopropenoxysilane and like epoxy group-containing silanes; (meth)acrylic group-containing alkoxysilanes such as γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane, acryloxymethyltriethoxysilane and like (meth)acryl group-containing silanes; isocyanato group-containing alkoxysilanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane and like isocyanato group-containing silanes; isocyanurate group-containing alkoxysilanes such as tris(trimethoxysilyl)isocyanurate and like isocyanurate silanes; carbamate group-containing alkoxysilanes; amino group-containing alkoxysilanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane and like amino group-containing silanes; mercapto group-containing alkoxysilanes such as γ-mercaptopropyltrimethoxysilane, γ-mercaptopropyltriethoxysilane, γ-mercaptopropylmethyldimethoxysilane, γ-mercaptopropylmethyldiethoxysilane and like mercapto group-containing silanes; carboxyl group-containing alkxoysilanes such as β-carboxyethyltriethoxysilane, β-carboxyethylphenylbis(2-methoxyethoxy)silane, N-β-(carboxymethyl)aminoethyl-γ-aminopropyltrimethoxysilane and like carboxysilanes; halogen group-containing alkoxysilanes such as γ-chloropropyltrimethoxysilane and like halogen-containing silanes. These may be used singly or two or more of them may be used in combination.

Also usable as the silane coupling agent are modified derivatives of these, for example amino-modified silyl polymers, silylated amino polymers, unsaturated aminosilane complexes, phenylamino-long chain alkylsilanes, aminosilylated silicones, and silylated polyesters.

Further, among these, alkoxysilanes having an epoxy group or (meth)acryl group within the molecule are preferred from the curability and adhesiveness viewpoint.

For further improving the adhesiveness, a crosslinkable silyl group condensation catalyst can be used in combination with the above adhesive property-providing agent. As the crosslinkable silyl group condensation catalyst, there may be mentioned organotin compounds such as dibutyltin dilaurate, dibutyltin diacetylacetonate, dibutyltin dimethoxide and stannous octylate, organoaluminum compounds such as aluminum acetylacetonate, and organotitanium compounds such as tetraisopropoxytitanium and tetrabutoxytitanium, among others.

Other specific examples than silane coupling agents include, but are not particularly limited to, epoxy resins, phenol resins, sulfur, alkyl titanates, aromatic polyisocyanates and the like.

The above adhesive property providing agent is used preferably in an amount of 0.01 to 20 parts by weight per 100 parts by weight of the vinyl polymer. At a level below 0.01 parts by weight, the adhesiveness improving effect tends to become poor and, at levels exceeding 20 parts by weight, the physical properties of the cured products may be adversely affected. The range of 0.1 to 10 parts by weight is preferred, and the range of 0.5 to 5 parts by weight is more preferred.

The adhesive property-providing agents specifically mentioned above may be used singly or two or more of them may be used in admixture. By adding these adhesive property-providing agents, it is possible to improve the adhesion to adherends.

<Method of Molding>

In using the curable composition of the present invention in the form of moldings, the method of molding is not particularly restricted but may be any of various molding methods in general use. For example, there may be mentioned cast molding, compression molding, transfer molding, injection molding, extrusion molding, rotational molding, blow molding, thermal molding, etc. In particular, injection molding is preferred in view of the possibility of automation and continuous operation, and good productivity. For use as gaskets, for instance, both the wet type process, in which the curable composition interposed between the mating faces of flanges or the like is compressed from both sides in the uncured condition, followed by curing, and the dry type one, in which the composition is first cured and then compressed, can be used.

<Uses>

The curable composition of the present invention can be used in various fields of application which include, but are not limited to, sealing materials, for example elastic sealing materials for building and construction and sealing materials for multilayer glass, electric and electronic part materials such as solar cell back sealers, electric insulating materials such as wire/cable insulating sheath, pressure sensitive adhesive materials, adhesives, elastic adhesives, paints, powder paints, coating compositions, foamed bodies, potting materials for electric and electronic use, films, gaskets, casting materials, artificial marble, various molding materials, and rust proof and waterproof sealants for end faces (cut sections) of net glass or multilayer glass.

Further, moldings showing rubber elasticity as obtained from the curable composition of the present invention can be widely used as gaskets and packing materials. For example, they can be used as body parts in the automobile field, sealants for securing air tightness, vibration damper materials for glass, and vibration damper materials for automotive bodies, in particular, window sealing gaskets and door glass gaskets. They can be used as chassis parts, such as engine and suspension rubbers for vibration-damping and sound-insulating materials, in particular engine mount rubbers. As for engine parts, they can be used in producing hoses for cooling, fuel feeding and exhaust control, or as engine oil sealants and so on. They can be used also as or in exhaust gas cleaner parts and brake parts. In the field of household electric appliances, they can be used as packing materials, O rings, belts and the like. More specifically, they can be used as decorations for lights, waterproofing packing materials, vibration damping rubbers, packing materials for protection against insects, vibration-damping, sound-insulating and airtight-sealing materials for cleaners, parts for water warmers, such as covers for protecting them against water drops, water-tight packing materials, packing materials for heater parts, packing materials for electrode parts and safety valve diaphragms, parts for sake warmers, such as hoses, watertight packing materials and electromagnetic valves, parts for steam oven ranges and rice cookers, such as watertight packing materials, water tank packing materials, suction pumping valves, bucket packing materials, connecting hoses, belts, and heat-retaining heater packing materials, and parts for combustion apparatus (for example, steam diffuser seals), such as oil packing materials O rings, drain packing materials, pressure tubes, blast tubes, air feeder/suction packing materials, vibration damping rubbers, fuel filler packing materials, fuel level indicator packing materials, fuel pipes, diaphragm valves, air-supplying pipes and so forth as well as speaker gaskets, speaker edges, turntable sheets, belts, pulleys and the like for acoustic apparatus, among others. In the field of building and construction, they can be used as or in structural gaskets (zipper gaskets), air membrane structure roofing materials, waterproofing materials, shaped sealing materials, vibration dampers, sound insulators, setting blocks, sliders and so on. In the field of sports, they can be used as or in sports floors such as all weather pavements and gymnasium floors, in the field of sports shoes, as sole materials and insole materials and, in the field of ball games, as golf balls and so on. In the vibration damping rubber field, they can be used as vibration damping rubbers for automobiles, vibration damping rubbers for railroad vehicles, vibration damping materials for airplanes, fenders, and so on. In the field of marine and civil engineering, they can be used as structural materials such as rubber expansion joints, bearing structures, water sealing plates, waterproofing sheets, rubber dams, elastic pavement materials, vibration damping pads, guard or protective structures, etc., supplementary building and construction materials such as rubber molds, rubber packers, rubber skirts, sponge mats, mortar hoses, mortar strainers, etc., and auxiliary building and construction materials such as rubber sheets, air hoses, etc., safety precaution articles such as rubber buoys, wave absorbing structures, etc., and environmental conservation goods such as oil fences, silt fences, antifouling materials, marine hoses, dressing hoses, oil skimmers and so forth. Furthermore, they may be used as plate or sheet rubbers, mats, foamed plates, etc.

BEST MODES FOR CARRYING OUT THE INVENTION

The following specific examples illustrate the present invention. They are by no means limitative of the scope of the present invention, however. The adsorbents used in the examples or comparative examples are summarized in Table 1.

TABLE 1

Adsorbent types and species used

| Adsorbent | Product | Classification |
|---|---|---|
| Activated carbon | Product of Wako Pure Chemical Industries | |
| Activated terra alba | Galleon Earth V2 (product of Mizusawa Industrial Chemicals) | Acidic adsorbent |
| Aluminum silicate $Al_2O_3 \cdot 9SiO_2 \cdot H_2O$ | Kyowaad 700 series (SN, SL, PEL) (product of Kyowa Chemical) | Acidic adsorbent |
| Magnesium silicate | Mizukalife P-1G (product of Mizusawa Industrial Chemicals) | Acidic adsorbent |
| Aluminum hydroxide $Al(OH)_3 \cdot XH_2O$ | Kyowaad 200 (product of Kyowa Chemical) | Basic adsorbent |
| Magnesium oxide MgO | Kyowamag 150 (product of Kyowa Chemical) | Basic adsorbent |
| Hydrotalcite species $Mg_6Al_2(OH)_{16}CO_3 \cdot 4H_2O$ | Kyowaad 500 series (PL, SH) (product of Kyowa Chemical) | Basic adsorbent |
| Hydrotalcite species $Mg_{4.5}Al_2(OH)_{13}CO_3 \cdot 3.5H_2O$ | Kyowaad 1000 (product of Kyowa Chemical) | Basic adsorbent |
| Hydrotalcite species $Mg_{0.7}Al_{0.3}O_{1.15}$ | Kyowaad 2000 (product of Kyowa Chemical) | Basic adsorbent |
| Activated alumina | Product of Wako Pure Chemical Industries | Basic adsorbent |

PRODUCTION EXAMPLE 1

Method of Producing an Alkenyl-terminated Vinyl Polymer

A 10-L separable flask equipped with a reflux condenser and a stirrer was charged with CuBr (42.0 g, 0.29 mol), and the reaction vessel inside was purged with nitrogen. Acetonitrile (559 mL) was added, and the contents were stirred on an oil bath at 70° C. for 45 minutes. Thereto were added butyl acrylate (1.00 kg), diethyl 2,5-diboromoadipate (175 g, 0.488 mol) and pentamethyldiethylenetriamine (hereinafter referred to as "triamine" for short)(4.00 mL, 19.2 mmol), and the reaction was thereby started. After the lapse of 60 minutes after the start of reaction, butyl acrylate (4.00 kg) was added dropwise continuously over 190 minutes while heating at 70° C. with stirring. During the dropping of butyl acrylate, triamine (4.00 mL, 19.2 mmol) was added. After the subsequent 60 minutes of heating at 70° C. with stirring, 1,7-octadiene (1.44 L, 9.75 mol) and triamine (20.5 mL, 0.0974 mol) were added, and the heating at 70° C. was continued with stirring for 210 minutes.

The volatile matter was distilled off from the reaction mixture under reduced pressure, the residue was dissolved in hexane, and the solid matter was filtered off to give an alkenyl-terminatedpolymer (polymer [1]). The polymer [1] had a number average molecular weight of 14,000 as determined by GPC measurement (polystyrene equivalent basis) with a molecular weight distribution of 1.34. The average number of alkenyl groups introduced per polymer molecule as determined by $^1H$ NMR analysis was 2.5.

PRODUCTION EXAMPLE 2

Method (1) of Br Treatment of the Alkenyl-terminated Vinyl Polymer

A reaction vessel was charged with the polymer [1] (10 g) obtained in Production Example 1 and potassium benzoate (0.57 g), N,N-dimethylacetamide (10 mL, hereinafter referred to as "DMAC") was added, and the mixture was heated at 100° C. with stirring in a nitrogen atmosphere for 4 hours. The DMAC was distilled off with heating under reduced pressure, and toluene was added to the mixture thus obtained. The solid matter was filtered off, and the filtrate was concentrated to give a bromine group-free polymer (polymer [2]).

PRODUCTION EXAMPLE 3

Method (2) of Br Treatment of the Alkenyl-terminated Vinyl Polymer

A reaction vessel was charged with the polymer [1] (300 g) obtained in Production Example 1 and potassium acetate (6.68 g), DMAC(300 mL) was added, and the mixture was heated at 100° C. with stirring in a nitrogen atmosphere for 8 hours. The DMAC was distilled off with heating under reduced pressure, and toluene was added to the mixture thus obtained. The solid matter was filtered off, and the filtrate was concentrated to give a bromine group-free polymer (polymer [3]).

EXAMPLE 1

Adsorption Treatment

The polymer [1] (5.0 g) was dissolved in toluene (15 mL). To the solution were added a hydrotalcite adsorbent (0.25 g; Kyowaad 500PL, product of Kyowa Chemical) as a basic adsorbent, and magnesium silicate (0.25 g; Mizukalife P-1G, product of Mizusawa Industrial Chemicals) as an acidic adsorbent. The mixture was then heated at 100° C. with stirring for 1 hour. Dilution with toluene, separation of the adsorbents by filtration and concentration of the filtrate gave a vinyl polymer.

Curing Test

The polymer after adsorption treatment was manually blended with a linear siloxane having, in each molecule, 5 hydrosilyl groups on average and 5 α-methylstyrene groups on average (Si—H value: 3.70 mmol/g) and a xylene solution of zero-valent platinum-1,1,3,3-tetramethyl-1,3-divinyldisiloxane complex (platinum concentration $1.3 \times 10^{-5}$ mmol/µl) at room temperature, whereby a hydrosilylation reaction-susceptible composition was obtained. The amount of the linear siloxane used was such that the alkenyl group-to-hydrosilyl group mole ratio amounted to 1/1.5, and the amount of the platinum catalyst was expressed in terms of the mole ratio to the alkenyl group.

A portion of the composition was heated on a hot plate at 130° C. with stirring in an air atmosphere, and the gelation time was measured. The results are shown in Table 2.

Residual Copper Quantification

The polymer after adsorption treatment was mixed with ultrahigh purity nitric acid and ultrahigh purity sulfuric acid, and the mixture was subjected to microwave decomposition. The residual copper in the decomposition product was assayed using an ICP mass spectrometer (Yokogawa Analytical Systems model HP-4500), and the residual copper in the polymer was quantified. The result is shown in Table 2.

EXAMPLE 2

Following the same procedures as in Example 1, polymer adsorption treatment, curing test of the polymer obtained by adsorption treatment (gelation time measurement) and quantification of the residual copper in the polymer was carried out. The polymer subjected to adsorption treatment, the adsorbents used, amounts of the adsorbents, the curing test results (gelation times) and the residual copper content are shown in Table 2.

COMPARATIVE EXAMPLE 1

Adsorption Treatment

The polymer [1] (5.0 g) was dissolved in toluene (15 mL). To the solution was added activated terra alba (0.50 g; Galleon Earth V2, product of Mizusawa Industrial Chemicals) as an acidic adsorbent. The mixture was then heated at 100° C. with stirring for 1 hour. Dilution with toluene, separation of the adsorbent by filtration and removal of the toluene by distillation gave a vinyl polymer.

Curing Test

The polymer after adsorption treatment was subjected to curing test according to the same procedure as in Example 1, and the gelation times were measured. The results are shown in Table 2.

Residual Copper Quantification

Following the same procedure as in Example 1, the polymer after adsorption treatment was assayed for residual copper in the polymer. The result is shown in Table 2.

COMPARATIVE EXAMPLES 2 to 12

Following the same procedures as in Comparative Example 1, polymer adsorption treatment, test curing of the polymers obtained by adsorption treatment (gelation time measurement) and quantification of the residual copper in the polymers were carried out. The polymers subjected to adsorption treatment, the adsorbents used, amounts of the adsorbents, the curing test results (gelation times) and the residual copper contents are shown in Table 2.

TABLE 2

| Example | Polymer subjected to adsorption treatment | Adsorbent | Amount of adsorbent used (wt % relative to polymer) | Curing test Gelation time (sec) Platinum catalyst addition amount | | | Residual copper content (ppm) |
|---|---|---|---|---|---|---|---|
| | | | | $10^{-2}$ eq | $5 \times 10^{-3}$ eq | $2 \times 10^{-3}$ eq | |
| Example 1 | Polymer [1] | Kyowaad 500PL /Mizukalife P-1G | 5/5 | 10 | 30 | | 4.0 |
| Example 2 | Polymer [3] | Kyowaad 500SH /Kyowaad 700SL | 5/5 | | | 10 | 8.4 |
| Compar. Ex. 1 | Polymer [1] | Galleon Earth V2 | 10 | 80 | >120 | >120 | 140 |
| Compar. Ex. 2 | Polymer [1] | Kyowaad 700SN | 10 | 50 | >120 | >120 | 110 |
| Compar. Ex. 3 | Polymer [1] | Kyowaad 700SL | 10 | 20 | 40 | >120 | 100 |
| Compar. Ex. 4 | Polymer [1] | Kyowaad 700PEL | 10 | 10 | 40 | >120 | 46 |
| Compar. Ex. 5 | Polymer [1] | Mizukalife P-1G | 10 | | 20 | >120 | 22 |
| Compar. Ex. 6 | Polymer [1] | Kyowaad 200 | 10 | 60 | >120 | >120 | 22 |
| Compar. | Polymer | Kyowamag | 10 | 40 | >120 | >120 | 11 |

TABLE 2-continued

| | | | | Curing test | | | |
|---|---|---|---|---|---|---|---|
| | Polymer subjected to adsorption | | Amount of adsorbent used | Gelation time (sec) Platinum catalyst addition amount | | | Residual copper |
| Example | treatment | Adsorbent | (wt % relative to polymer) | $10^{-2}$ eq | $5 \times 10^{-3}$ eq | $2 \times 10^{-3}$ eq | content (ppm) |
| Ex. 7 | [1] | 150 | | | | | |
| Compar. Ex. 8 | Polymer [1] | Kyowaad 500PL | 10 | 30 | 80 | >120 | 1.5 |
| Compar. Ex. 9 | Polymer [1] | Kyowaad 500SH | 10 | 60 | >120 | >120 | |
| Compar. Ex. 10 | Polymer [1] | Kyowaad 1000 | 10 | 90 | >120 | >120 | |
| Compar. Ex. 11 | Polymer [1] | Kyowaad 2000 | 10 | 30 | >120 | >120 | 11 |
| Compar. Ex. 12 | Polymer [3] | Kyowaad 700PEL | 10 | | 20 | >120 | |

*">120" means "not yet cured after 120 seconds".

The results shown in Table 2 indicate the following. When an acidic adsorbent alone is used, the residual copper content was high and the amount of the platinum catalyst as required for the manifestation of curability was as large as $5 \times 10^{-3}$ to $10^{-2}$ equivalent (Comparative Examples 1 to 5 and 12). When a basic adsorbent alone was used, the residual copper content was low but the amount of the platinum catalyst as required for the manifestation of curability was as large as $5 \times 10^{-3}$ to $10^{-2}$ equivalent (Comparative Examples 6 to 11). On the contrary, when the adsorption treatment was carried out using the acidic adsorbent and basic adsorbent combinedly, the amount of the platinum catalyst required for gelation was small and the residual copper content was also low. In particular when a hydrotalcite adsorbent and aluminum silicate were used in combination, curability was shown at a platinum catalyst amount of $2 \times 10^{-3}$ equivalents.

PRODUCTION EXAMPLE 4

Method of Producing an Alkenyl-terminated Vinyl Polymer

A 10-L separable flask equipped with a reflux condenser and a stirrer was charged with CuBr (42.0 g, 0.29 mol), and the reaction vessel inside was purged with nitrogen. Acetonitrile (559 mL) was added, and the contents were stirred on an oil bath at 70° C. for 45 minutes. Thereto were added butyl acrylate (1.00 kg), diethyl 2,5-dibromoadipate (175 g, 0.488 mol) and pentamethyldiethylenetriamine (hereinafter referred to as "triamine")(4.00 mL, 19.2 mmol), and the reaction was thereby started. After the lapse of 60 minutes after the start of reaction, butyl acrylate (4.00 kg) was added dropwise continuously over 190 minutes while heating at 70° C. with stirring. During the dropping of butyl acrylate, triamine (4.00 mL, 19.2 mmol) was added. After the subsequent 60 minutes of heating at 70° C. with stirring, 1,7-octadiene (1.44 L, 9.75 mol) and triamine (20.5 mL, 0.0974 mol) were added, and the heating at 70° C. was continued with stirring for 210 minutes.

The volatile matter was distilled off from the reaction mixture under reduced pressure, the residue was dissolved in hexane, and the solid matter was filtered off to give an alkenyl-terminatedpolymer (polymer [4]). The polymer [4] had a number average molecular weight of 13,000 as determined by GPC measurement (polystyrene equivalent basis) with a molecular weight distribution of 1.23. The average number of alkenyl groups introduced per polymer molecule as determined by $^1$H NMR analysis was 1.5.

PRODUCTION EXAMPLE 5

Method of Br Treatment of the Alkenyl-terminated Vinyl Polymer

A reaction vessel was charged with the polymer [4] (300 g) obtained in Production Example 4 and potassium acetate (6.68 g), DMAC(300 mL) was added, and the mixture was heated at 100° C. with stirring in a nitrogen atmosphere for 8 hours. The DMAC was distilled off with heating under reduced pressure, and toluene was added to the mixture thus obtained. The solid matter was filtered off, and the filtrate was concentrated to give a bromine group-free polymer (polymer [5]).

EXAMPLE 3

Reduction of Diluent Solvent Amount in the Step of Adsorption Treatment

Adsorption Treatment

The polymer [5] (3.0 g) was mixed with toluene (0.30 g) To the mixture were added a hydrotalcite adsorbent (0.030 g; Kyowaad 500SH, product of Kyowa Chemical) and aluminum silicate (0.030 g; Kyowaad 700SL, product of Kyowa Chemical). The mixture was then heated at 110° C. with stirring for 1 hour. Dilution with toluene, separation of the adsorbents by filtration and removal of the toluene by distillation gave a vinyl polymer.

Curing Test

The polymer after adsorption treatment was subjected to curing test according to the same procedure as in Example 1, and the gelation times were measured. The results are shown in Table 4.

Residual Copper Quantification

Following the same procedure as in Example 1, the polymer after adsorption treatment was assayed for residual copper therein. The result is shown in Table 4.

EXAMPLES 4 to 8

Following the same procedures as in Example 3, polymer adsorption treatment, curing testing of the polymers obtained by adsorption treatment (gelation time measurement) and quantification of the residual copper in the polymers were carried out. The polymers treated, and adsorption treatment conditions (adsorbents used, adsorbent amounts, solvents used, polymer concentrations, temperatures, periods) are shown in Table 3. The curing test results (gelation times) and the residual copper contents are shown in Table 4.

TABLE 3

Adsorption treatment conditions

| | Polymer | Adsorbent | Total amount of adsorbents used[1] wt % (relative to polymer) | Solvent | Polymer concentration[2] wt % | Temperature °C. | Period Hr |
|---|---|---|---|---|---|---|---|
| Example 3 | Polymer [5] | Kyowaad500SH/ Kyowaad700SL | 2 | Toluene | 91 | 110 | 1 |
| Example 4 | Polymer [5] | Kyowaad500SH/ Kyowaad700SL | 2 | Xylene | 91 | 130 | 3 |
| Example 5 | Polymer [5] | Kyowaad500SH/ Kyowaad700SL | 2 | None | 100 | 130 | 3 |
| Example 6 | Polymer [5] | Kyowaad500SH/ Kyowaad700SL | 2 | None | 100 | 150 | 6 |
| Example 7 | Polymer [5] | Kyowaad500SH/ Kyowaad700SL | 10 | Toluene | 54 | 100 | 1 |
| Example 8 | Polymer [5] | Kyowaad500SH/ Kyowaad700SL | 10 | Toluene | 54 | 100 | 3 |

[1]Total amount of adsorbents used: Total weight of Kyowaad 500SH and Kyowaad 700SL used.
[2]Polymer concentration = (polymer weight/ (polymer weight + solvent weight)) × 100

TABLE 4

Adsorption treatment results

| | Gelation time (sec) Amount of platinum catalyst | | | | Residual copper content |
|---|---|---|---|---|---|
| | $2 \times 10^{-3}$ eq | $10^{-3}$ eq | $5 \times 10^{-4}$ eq | $3 \times 10^{-4}$ eq | (ppm) |
| Example 3 | 70 | 130 | | | 60.0 |
| Example 4 | | 10 | 70 | | 14.0 |
| Example 5 | | 10 | 60 | | 12.0 |
| Example 6 | | <5 | 30 | 100 | 8.6 |
| Example 7 | 10 | >120 | | | |
| Example 8 | | <5 | >120 | | 8.4 |

[1]">120" means "not yet cured after 120 seconds".
[2]Platinum catalyst addition level is the mole ratio to the alkenyl group.

PRODUCTION EXAMPLE 6

Method of Producing an Alkenyl-terminated Vinyl Polymer (Copolymer) and Method of Br Treatment A 10-L separable flask equipped with a reflux condenser and a stirrer was charged with CuBr (36.02 g, 0.2511 mol), and the reaction vessel inside was purged with nitrogen. Acetonitrile (618 mL) was added, and the contents were stirred on an oil bath at 70° C. for 15 minutes. Thereto were added butyl acrylate (360 mL, 2.51 mol), ethyl acrylate (500 mL, 4.62 mol), 2-methoxyethyl acrylate (375 mL, 2.91 mol), diethyl 2,5-diboromoadipate (150.68 g, 0.419 mol) and pentamethyldiethylenetriamine (hereinafter referred to as "triamine")(2.18 mL, 1.81 g, 10.46 mmol), and the reaction was thereby started. While heating at 70° C. with stirring, a mixture composed of butyl acrylate (1,440 mL), ethyl acrylate (2,002 mL) and 2-methoxyethyl acrylate (1,498 mL) was added dropwise continuously over 210 minutes. During the dropping of the monomer mixture, triamine (7.63 mL, 6.33 g, 36.5 mmol) was added. After the lapse of 330 minutes after start of the reaction, 1,7-octadiene (1,236 mL, 922 g, 8.37 mol) and triamine (26.16 mL, 21.71 g, 0.125 mol) were added, and the heating at 70° C. with stirring was continued for 250 minutes.

The reaction mixture was diluted with toluene and passed through an activated alumina column, and the volatile matter was then distilled off under reduced pressure to give an alkenyl-terminated copolymer {alkenyl-terminated poly(butyl acrylate, ethyl acrylate, methoxyethyl acrylate); hereinafter referred to as copolymer [1]}.

A 10-L separable flask equipped with a reflux column was charged with the copolymer [1] (2.87 kg), potassium acetate (79.57 g) and N,N-dimethylacetamide (2.9 L), and the mixture was heated at 100° C. with stirring under a nitrogen stream for 12 hours. The N,N-dimethylacetamide was removed by heating under reduced pressure, and the residue was diluted with toluene. The toluene-insoluble matter (KBr and excess potassium acetate) was filtered off using an activated alumina column. The volatile matter was distilled off from the filtrate under reduced pressure to give a copolymer (copolymer [2]).

EXAMPLE 9

Adsorption Treatment of the Copolymer, Preparation of a Hydrosilylation Reaction-susceptible Composition and Production of Cured Products A 10-L separable flask equipped with a reflux column was charged with the copolymer [2] (2.87 kg), aluminum silicate (143 g, Kyowaad 700SL, product of Kyowa Chemical), a hydrotalcite adsorbent (143 g, Kyowaad 500SH, product of Kyowa Chemical) and. toluene (5.2 L), and the mixture was heated at 100° C. under a nitrogen stream for 7 hours. The adsorbents were filtered off, and the toluene was distilled off from the filtrate under reduced pressure to give a vinyl group-terminated copolymer (copolymer [3]). The copolymer obtained had a number average molecular weight of 18,000 as determined by GPC measurement (polystyrene equivalent basis) with a molecular weight distribution of 1.24. The average number of vinyl groups introduced per copolymer molecule as determined by $^1$H NMR analysis was 2.2.

The copolymer [3] (alkenyl group content 0.158 mmol/g) was uniformly blended with a linear siloxane (containing, in each molecule, 5 hydrosilyl groups on average and 5 α-methylstyrene groups on average; Si—H group amount 3.70 mmol/g). The resulting mixture was uniformly blended with the 1,3-divinyl-1,1,3,3-tetramethyldisiloxane-platinum complex catalyst ($1.3 \times 10^{-5}$ mmol/μl solution in xylene). The amount of the linear siloxane was selected at a level such that the SiH groups of the linear siloxane amounted to 2.32 equivalents relative to the alkenyl groups of the copolymer [3], and the amount of the platinum catalyst at a level such that the mole ratio thereof to the alkenyl group amounted to $6.5 \times 10^{-4}$ equivalents. A portion of the thus-obtained hydrosilylation reaction-susceptible composition was heated at 150° C., and the gelation time was measured. It was 14 seconds. The hydrosilylation reaction-susceptible composition was poured into a mold and heated at 150° C., whereby a cured product having rubber elasticity was obtained.

PRODUCTION EXAMPLE 7

A 10-L separable flask equipped with a reflux condenser and a stirrer was charged with CuBr (50.4 g, 0.35 mol), and the reaction vessel inside was purged with nitrogen. Acetonitrile (670 mL) was added, and the contents were stirred on an oil bath at 70° C. for 30 minutes. Thereto were added butyl acrylate (1.20 kg), diethyl 2,5-dibromoadipate (105 g, 0.29 mol) and pentamethyldiethylenetriamine (hereinafter referred to as "triamine")(2.44 mL, 11.7 mmol), and the reaction was thereby started. While heating at 70° C. with stirring, butyl acrylate (4.80 kg) was added dropwise continuously. During the dropping of butyl acrylate, triamine (9.8 mL, 47 mmol) was added. After the subsequent heating at 70° C. with stirring, 1,7-octadiene (1.73 L) and triamine (18.3 mL, 88 mmol) were added, and the heating at 70° C. was further continued with stirring for 4 hours.

The reaction mixture was diluted with toluene, and the insoluble matter was filtered off. The filtrate was concentrated to give an alkenyl-terminated polymer (polymer [6]). The polymer [6] had a number average molecular weight of 25,700 as determined by GPC measurement (polystyrene equivalent basis) with a molecular weight distribution of 1.30. The average number of alkenyl groups introduced per polymer molecule as determined by $^1$H NMR analysis was 2.6.

A reaction vessel was charged with the polymer [6] (392 g) and potassium acetate (7.7 g), DMAC. (400 mL) was added, and the mixture was heated at 100° C. with stirring in a nitrogen atmosphere for 10 hours. The DMAC was distilled off with heating under reduced pressure, and toluene was added to the mixture thus obtained. The solid matter was filtered off, and the filtrate was concentrated to give a bromine group-free polymer (polymer [7]).

EXAMPLE 10

The polymer [7] (300 g) obtained in Production Example 7 was mixed with toluene (30 mL). To the mixture were added a hydrotalcite adsorbent (3.0 g; Kyowaad 500SH, product of Kyowa Chemical) as a basic adsorbent and aluminum silicate (3.0 g; Kyowaad 700SL, product of Kyowa Chemical) as an acidic adsorbent. The mixture was then heated at 150° C. with stirring for 3 hours. Dilution with toluene, separation of the adsorbents by filtration and concentration of the filtrate gave a polymer (polymer [8]).

The polymer [8] was manually blended with a linear siloxane having, in each molecule, 5 hydrosilyl groups on average and 5 α-methylstyrene groups on average (Si—H value: 3.70 mmol/g) and a xylene solution of zero-valent platinum-1,1,3,3-tetramethyl-1,3-divinyldisiloxane complex (platinum concentration $1.3 \times 10^{-5}$ mmol/μl) at room temperature, whereby a hydrosilylation reaction-susceptible composition was obtained. The amount of the linear siloxane used was such that the alkenyl group-to-hydrosilyl group mole ratio amounted to 1/1.5, and the amount of the platinum catalyst was such that the mole ratio thereof to the alkenyl group amounted to $10^{-3}$ equivalent. A portion of the thus-obtained composition was heated at 130° C., and the gelation time was measured. It was 40 seconds.

EXAMPLE 11

Method of Producing an Alkoxysilyl Group-terminated Vinyl Polymer

The polymer [8] (30 g) obtained in Example 10 was heated at 100° C. while reducing the pressure. After restoring normal pressure with nitrogen, methyl orthoformate (0.33 mL, 3.0 mmol) and a xylene solution of zero valent platinum-1,1,3,3-tetramethyl-1,3-divinyldisiloxane complex (1.13 mL; platinum concentration $1.3 \times 10^{-5}$ mmol/μl) were added, followed by mixing up, under a nitrogen stream. After pressurization to 1.5 MPa with nitrogen, the mixture was heated at 100° C. with stirring for 2 hours. The volatile matter was removed under heating to give an alkoxysilyl group-containing polymer (polymer [9]). The polymer [9] had a number average molecular weight of 33,300 as determined by GPC measurement (polystyrene equivalent basis) with a molecular weight distribution of 1.62. The average number of silyl groups introduced per polymer molecule as determined by $^1$H NMR analysis was 1.7.

EXAMPLE 12

Method of Producing a Cured Product

The polymer [9] obtained in Example 11 was mixed up with a tetravalent tin catalyst (dibutyltin diacetylacetonate) to give a curable composition. When allowed to stand at room temperature for 6 hours, the composition gave a cured product having rubber elasticity.

EXAMPLE 13

Combined Use of Another Adsorbent

The polymer [7] (5.6 g) obtained in Production Example 7 was blended with xylene (0.56 g). To the mixture were added activated carbon (0.037 g; product of Wako Pure Chemical Industries, powder form), a hydrotalcite adsorbent (0.037 g; Kyowaad 500SH, product of Kyowa Chemical) and aluminum silicate (0.037 g; Kyowaad 700SL, product of Kyowa Chemical), and the mixture was heated at 150° C. with stir ring for 3 hours. Dilution with toluene, adsorbent removal by filtration and concentration of the filtrate gave a polymer (polymer [10]).

The polymer [10] was subjected to test curing in the same manner as in Example 1, and the gelation times were measured. When the platinum catalyst was used in an amount of 5×10⁻⁴ equivalents relative to the alkenyl group, the gelation time at 130° C. was 40 seconds.

PRODUCTION EXAMPLE 8

A 10-L separable flask equipped with a reflux condenser and a stirrer was charged with CuBr (50.4 g, 0.35 mol), and the reaction vessel inside was purged with nitrogen. Acetonitrile (670 mL) was added, and the contents were stirred on an oil bath at 70° C. for 30 minutes. Thereto were added butyl acrylate (1.20 kg), diethyl 2,5-dibromoadipate (105 g, 0.29 mol) and pentamethyldiethylenetriamine (hereinafter referred to as "triamine")(2.44 mL, 11.7 mmol), and the reaction was thereby started. While heating at 70° C. with stirring, butyl acrylate (4.80 kg) was added dropwise continuously. During the dropping of butyl acrylate, triamine (9.8 mL, 47 mmol) was added. After the subsequent heating at 70° C. with stirring, 1,7-octadiene (1.73 L) and triamine (18.3 mL, 88 mmol) were added, and the heating at 70° C. was continued with stirring for further 4 hours. The reaction mixture was diluted with toluene, and the solid matter was filtered off. Concentration of the filtrate gave an alkenyl group-terminated polymer (polymer [11]). The polymer [11] had a number average molecular weight of 26,600 as determined by GPC measurement (polystyrene equivalent basis) with a molecular weight distribution of 1.27. The average number of alkenyl groups introduced per polymer molecule as determined by $^1$H NMR analysis was 2.7.

EXAMPLE 14

Adsorption Treatment in the Presence of Br Treatment Agents and an Inorganic Salt A reaction vessel was charged with the polymer [11] (625 g) obtained in Production Example 8 and potassium acetate (12.3 g), DMAC(600 mL) was added, and the mixture was heated at 100° C. with stirring in a nitrogen atmosphere for 10 hours. The DMAC was distilled off with heating under reduced pressure to give a mixture (mixture [1]) of the polymer, potassium acetate and KBr.

The mixture [1] (300 g) was mixed with xylene (30 g). To the mixture was added a hydrotalcite adsorbent (1.5 g; Kyowaad 500SH, product of Kyowa Chemical), and the mixture was heated at 150° C. with stirring. Fifteen minutes later, Kyowaad 500SH (1.5 g) was added and, 30 minutes later, aluminum silicate (1.5 g; Kyowaad 700SL, product of Kyowa Chemical) was added and, after further 45 minutes, Kyowaad 700SL (1.5 g) was added. The mixture was further heated at 150° C. with stirring (the total heating period being 3 hours). The mixture was diluted with toluene, the adsorbents were filtered off, and the filtrate was concentrated to give a polymer (polymer [12]).

The polymer [12] was subjected to test curing in the same manner as in Example 1. When the platinum catalyst was used in an amount of 8×10⁻⁴ equivalents (mole ratio to the alkenyl group), the gelation time at 130° C. was 40 seconds.

EXAMPLE 15

The mixture [1] obtained in Example 14 was diluted with toluene, the potassium acetate and KBr were filtered off, and the filtrate was concentrated to give a polymer (polymer [13]). The polymer [13] (254 g) was mixed with xylene (2.54 g). To the mixture was added a hydrotalcite adsorbent (1.5 g; Kyowaad 500SH, product of Kyowa Chemical), and the mixture was heated at 150° C. with stirring. Fifteen minutes later, Kyowaad 500SH (1.5 g) was added and, 30 minutes later, aluminum silicate (1.5 g; Kyowaad 700SL, product of Kyowa Chemical) was added and, after further 45 minutes, Kyowaad 700SL (1.5 g) was added. The mixture was further heated at 150° C. with stirring (the total heating period being 3 hours). The mixture was diluted with toluene, the adsorbents were filtered off, and the filtrate was concentrated to give a polymer (polymer [14]).

The polymer [14] was subjected to test curing in the same manner as in Example 1, and the gelation times were measured. When the platinum catalyst was used in an amount of 8×10⁻⁴ equivalents (mole. ratio to the alkenyl group), the gelation time at 130° C. was 90 seconds.

EXAMPLE 16

Methyl orthoformate (3.0 mL, 27 mmol) and a xylene solution of zero valent platinum-1,1,3,3-tetramethyl-1,3-divinyldisiloxane complex (0.20 mL; platinum concentration 1.3×10⁻⁴ mmol/μl) were admixed with the polymer [12] (270 g) obtained in Example 14. After 3 hours of heating at 100° C. with stirring, a xylene solution of zero valent platinum-1,1,3,3-tetramethyl-1,3-divinyldisiloxane complex (0.40 mL; platinum concentration 1.3×10⁻⁴ mmol/μl) was further added. The mixture was further heated at 100° C. with stirring for 3 hours. The volatile matter was removed from the mixture to give an alkoxysilyl group-containing polymer (polymer [15]). The average number of silyl groups introduced per polymer molecule as determined by $^1$H NMR analysis was 1.8.

EXAMPLE 17

The polymer [15] obtained in Example 16 was mixed up with a tetravalent tin catalyst (dibutyltin diacetylacetonate) to give a curable composition. When allowed to stand at room temperature for 2 days and then heated at 50° C. for 3 days, the composition gave a cured product having rubber elasticity.

INDUSTRIAL APPLICABILITY

In accordance with the present invention, vinyl polymers obtainable by atom transfer radical polymerization can be purified economically and efficiently by adsorption treatment using an acidic adsorbent and a basic adsorbent combinedly, with the result that the reactivity in hydrosilylation thereof is improved. Thus, the polymers can be used as components in hydrosilylation reaction-susceptible compositions.

The invention claimed is:

1. A method of purifying a vinyl polymer obtained by atom transfer radical polymerization of a vinyl monomer(s) using a transition metal complex as a polymerization catalyst which method comprises bringing the vinyl polymer into contact with an acidic adsorbent and a basic adsorbent in a total amount of 0.01 to 10 parts by weight per 100 parts by weight of the vinyl polymer, wherein the acidic adsorbent and/or basic adsorbent is at least one member selected from the group consisting of activated carbon, a synthetic resin adsorbent, and an inorganic adsorbent.

2. The method of purifying a vinyl polymer according to claim 1, wherein the acidic adsorbent and/or basic adsorbent is an inorganic adsorbent.

3. The method of purifying a vinyl polymer according to claim 1, wherein the acidic adsorbent is activated terra alba or aluminum silicate.

4. The method of purifying a vinyl polymer according to claim 1, wherein the acidic adsorbent is aluminum silicate.

5. The method of purifying a vinyl polymer according to claim 1, wherein the basic adsorbent is activated alumina or a hydrotalcite.

6. The method of purifying a vinyl polymer according to claim 1, wherein the basic adsorbent is a hydrotalcite.

7. The method of purifying a vinyl polymer according to claim 1, wherein a solution of the vinyl polymer with a vinyl polymer concentration of not less than 90% by weight is brought into contact with an acidic adsorbent and/or a basic adsorbent.

8. The method of purifying a vinyl polymer according to claim 1, wherein the vinyl polymer is brought into contact with an acidic adsorbent and/or a basic adsorbent without using any solvent.

9. The method of purifying a vinyl polymer according to claim 1, wherein the vinyl polymer has a halogen group.

10. The method of purifying a vinyl polymer according to claim 1, wherein the vinyl polymer has an alkenyl group.

11. The method of purifying a vinyl polymer according to claim 1, wherein the vinyl polymer is one obtained by producing a halogen group-containing vinyl polymer by atom transfer radical polymerization and converting the halogen group to a substituent other than the halogen group by a nucleophilic substitution reaction.

12. The method of purifying a vinyl polymer according to claim 11,
wherein the vinyl polymer is brought into contact with an acidic adsorbent and/or a basic adsorbent without removing, from the polymer, the unreacted nucleophilic reagent and/or the halide resulting from the nucleophilic substitution reaction.

13. The method of purifying a vinyl polymer according to claim 1, wherein the central atom of the transition metal complex is copper.

14. The method of purifying a vinyl polymer according to claim 1, wherein a triamine compound is used as a ligand to the catalyst in the atom transfer radical polymerization.

15. The method of purifying a vinyl polymer according to claim 1, wherein the acidic adsorbent and basic adsorbent are used in total amount of 0.1 to 10 parts by weight per 100 parts by weight of the vinyl polymer.

16. A vinyl polymer which is obtained byte method of purifying a vinyl polymer according to claim 1.

17. A hydrosilylation reaction-susceptible composition which comprises (A) the vinyl polymer according to claim 16.

18. A hydrosilylation reaction-susceptible composition
which comprises (A) the vinyl polymer according to claim 16 and (B) a hydrosilyl group-containing compound.

19. A hydrosilylation reaction-susceptible composition
which comprises (A) the vinyl polymer according to claim 16, (B) a hydrosilyl group-containing compound and (C) a platinum catalyst.

20. A vinyl polymer which is obtained by subjecting the hydrosilylation reaction-susceptible composition according to claim 17 to hydrosilylation.

21. A crosslinkable silyl group-containing vinyl polymer
which is obtained by subjecting the hydrosilylation reaction-susceptible composition according to claim 17 to hydrosilylation.

22. A cured product which is obtained by subjecting the hydrosilylation reaction-susceptible composition according to claim 17 to hydrosilylation.

23. A molded article which is obtained by subjecting the hydrosilylation reaction-susceptible composition according to claim 17 to hydrosilylation.

24. A method of producing vinyl polymers which comprises using the method of purifying a vinyl polymer according to claim 1.

25. The method of purifying a vinyl polymer according to claim 1, wherein the synthetic resin adsorbent is an ion exchange resin.

26. The method of purifying a vinyl polymer according to claim 1 or 2, wherein the inorganic adsorbent is at least one member selected from the group consisting of silicon dioxide, magnesium oxide, silica gel, silica-aluminum, aluminum silicate, magnesium silicate, activated alumina, aluminum hydroxide, acidic terra alba, activated terra alba, a zeolite adsorbent, dawsonite compound, a hydrotalcite, and a calcined hydrotalcite.

* * * * *

UNITED STATES PATENT AND TRADEMARK OFFICE
CERTIFICATE OF CORRECTION

| | | |
|---|---|---|
| PATENT NO. | : 7,141,646 B2 | Page 1 of 1 |
| APPLICATION NO. | : 10/275911 | |
| DATED | : November 28, 2006 | |
| INVENTOR(S) | : Kenichi Kitano et al. | |

It is certified that error appears in the above-identified patent and that said Letters Patent is hereby corrected as shown below:

\*\* In Claim 16, column 48, in line 3, "A vinyl polymer which is obtained byte method of" should read -- A vinyl polymer which is obtained by the method of--.

In Claim 26, column 48, at line 41, "ide, magnesium oxide, silica gel, silica-aluminum, alumi-" should read -- ide, magnesium oxide, silica gel, silica-alumina, alumi- --.\*\*

Signed and Sealed this

Twenty-seventh Day of November, 2007

JON W. DUDAS
*Director of the United States Patent and Trademark Office*